US010269139B2

(12) United States Patent
Fu

(10) Patent No.: US 10,269,139 B2
(45) Date of Patent: Apr. 23, 2019

(54) COMPUTER PROGRAM, HEAD-MOUNTED DISPLAY DEVICE, AND CALIBRATION METHOD

(71) Applicant: SEIKO EPSON CORPORATION, Tokyo (JP)

(72) Inventor: Guoyi Fu, Vaughan (CA)

(73) Assignee: SEIKO EPSON CORPORATION, Tokyo (JP)

( * ) Notice: Subject to any disclaimer, the term of this patent is extended or adjusted under 35 U.S.C. 154(b) by 63 days.

(21) Appl. No.: 15/641,677

(22) Filed: Jul. 5, 2017

(65) Prior Publication Data

US 2018/0018791 A1    Jan. 18, 2018

(30) Foreign Application Priority Data

Jul. 12, 2016 (JP) ................................. 2016-137529

(51) Int. Cl.
| | |
|---|---|
| H04N 7/18 | (2006.01) |
| G06T 7/80 | (2017.01) |
| G06T 7/33 | (2017.01) |
| G02B 27/01 | (2006.01) |

(52) U.S. Cl.
CPC ............ G06T 7/80 (2017.01); G02B 27/0172 (2013.01); G02B 27/0176 (2013.01); G06T 7/337 (2017.01); *G02B 2027/0138* (2013.01); *G02B 2027/0178* (2013.01); *G06T 2207/20221* (2013.01); *G06T 2207/30204* (2013.01)

(58) Field of Classification Search
CPC ....................... G09G 2320/0693; G02B 27/017
See application file for complete search history.

(56) References Cited

U.S. PATENT DOCUMENTS

| 2013/0002857 A1* | 1/2013 | Kulik ..................... G01C 17/38 |
| | | 348/135 |
| 2014/0176418 A1 | 6/2014 | Ramachandran et al. |
| 2016/0080732 A1* | 3/2016 | Pedley ............... G02B 27/0172 |
| | | 345/8 |

FOREIGN PATENT DOCUMENTS

JP      2005-038321 A     2/2005

OTHER PUBLICATIONS

Lobo et al, "Relative Pose Calibration Between Visual and Inertial Sensors," Proceedings of the ICRA 2005 Workshop on Integration of Vision and Inertial Sensors—2nd InerVis, Apr. 2005.

* cited by examiner

*Primary Examiner* — Tat C Chio
*Assistant Examiner* — Fabio S Lima
(74) *Attorney, Agent, or Firm* — Oliff PLC

(57) ABSTRACT

A method includes acquiring first and second images that are captured by imaging a first real marker with a camera when the camera is respectively at a first and second positions with respect to the first real marker, deriving a motion of an inertial sensor based on output of the inertial sensor when the camera moves from the first position to the second position, displaying a marker image corresponding to a second real marker on a display, acquiring a third image that is obtained by capturing the second real marker with the camera when a user perceives the marker image and the second real marker being aligned with each other, and deriving a first spatial relationship between the camera and the inertial sensor and a second spatial relationship between the camera and the display based at least on the first and second images, the motion, and the third image.

8 Claims, 21 Drawing Sheets

COMPUTER PROGRAM, HEAD-MOUNTED DISPLAY DEVICE, AND CALIBRATION METHOD

BACKGROUND

1. Technical Field

The present invention relates to calibration of a spatial relationship.

2. Related Art

There has been known a head-mounted display device (hereinafter, also referred to as an HMD) which is worn on a user's head. For example, JP-A-2005-38321 discloses a video see-through type HMD in which an imaging section supported through a supporting section slides up and down with respect to a main body of the HMD.

Hereinafter, an HMD including a tracking camera so as to be capable of providing an AR (augmented reality) function will be described as an example of a see-through type display device. The HMD detects the position of a real object with respect to the HMD (or a tracking camera) through a tracking camera, and tracks the real object (the tracking of a real object using this method is referred to as "optical tracking") The HMD displays a virtual object such as CG so as to follow the position of the real object. At this time, a user visually perceives the virtual object so that the position of the virtual object is associated with the position of the real object.

The position and pose of the real object in a field of view of the tracking camera change depending not only on the motion of the real object but also on the motion (particularly, rotation) of the user's head. In a case where an angular velocity of the rotation of the head is high and/or an angle thereof is large, a time difference (latency) until changes in the position and pose of the real object are reflected on the display of the virtual object may become conspicuous through only the optical tracking.

SUMMARY

Technically, it is easy to make a time resolution of an inertial sensor higher than a time resolution (frame rate of an image) of a tracking camera. Consequently, as a measure of the above-mentioned latency, it is considered that it is effective to estimate the position and pose (a spatial positional relationship between a real object and an HMD) of the real object with respect to the HMD, mounted with not only a tracking camera but also an inertial sensor, by using the tracking camera and the inertial sensor (the tracking of a real object using this method is referred to as "inertia and optical uniting tracking)

As in the above-described case, in a case where the tracking camera and the inertial sensor function as a "tracker (tracking device)" in cooperation with each other, it is desired that a coordinate system of the tracking camera and a coordinate system of the inertial sensor are associated with each other (calibrated). In addition to a case of being used as the above-mentioned "tracker", it is useful that the coordinate system of the tracking camera and the coordinate system of the inertial sensor are calibrated, for example, in a case where the tracking camera and an image display section are calibrated on the basis of a user's eyes (retinas). It is preferable that a calibration method is simple and calibration results are highly accurate.

Further, when an image display apparatus including an optical see-through type head-mounted display device includes a technique of displaying an image at a position of a specific object, imaged by a camera, so as to be superimposed thereon with a high level of accuracy, it is possible to provide improved convenience with respect to an AR function. However, when a display image is correctly superimposed on the specific object imaged by the camera, it is desired that a spatial relationship between the camera and the image display section is calibrated.

As described above, it is preferable that two calibration methods are performed, but it is difficult to make the two calibration methods individually succeed.

An advantage of some aspects of the invention is to increase a success rate of calibration of a spatial relationship between the imaging section (tracking camera) and the inertial sensor (first spatial relationship) and a spatial relationship between the imaging section and the image display section (second spatial relationship) on the basis of the above description.

The invention can be implemented as the following configurations.

An aspect of the invention is directed to a non-transitory computer readable medium that embodies instructions that, when executed by a processor, perform a method of calibration for a head-mounted display device including a camera, an inertial sensor, an optical see-through type display, the method including: acquiring a first image and a second image that are captured by imaging a first real marker with a camera when the camera is respectively at a first position arid a second position with respect to the first real marker; deriving a motion of an inertial sensor based on output of the inertial sensor when the camera moves from the first position to the second position; displaying a marker image corresponding to a second real marker on a display; acquiring a third image that is obtained by capturing the second real marker with the camera when a user is allowed to visually perceive the marker image and the second real marker being aligned with each other; and deriving a first spatial relationship between the camera and the inertial sensor and a second spatial relationship between the camera and the display based at least on the first image, the second image, the motion of the inertial sensor, and the third image. According to this aspect, a success rate of calibration of the first and second spatial relationships increases. Meanwhile, the first real marker and the second real marker may be the same marker, or may be different markers.

In the aspect of the invention, at least one of the camera and the inertial sensor may be movable with respect to one another.

In the aspect of the invention, at least one of the camera and the display may be movable with respect to one another.

The invention can be implemented as various forms other than the above-mentioned aspects. For example, the invention can be implemented as a form such as a device that operates by executing the above-mentioned program or a method which is realized by the above-mentioned program.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
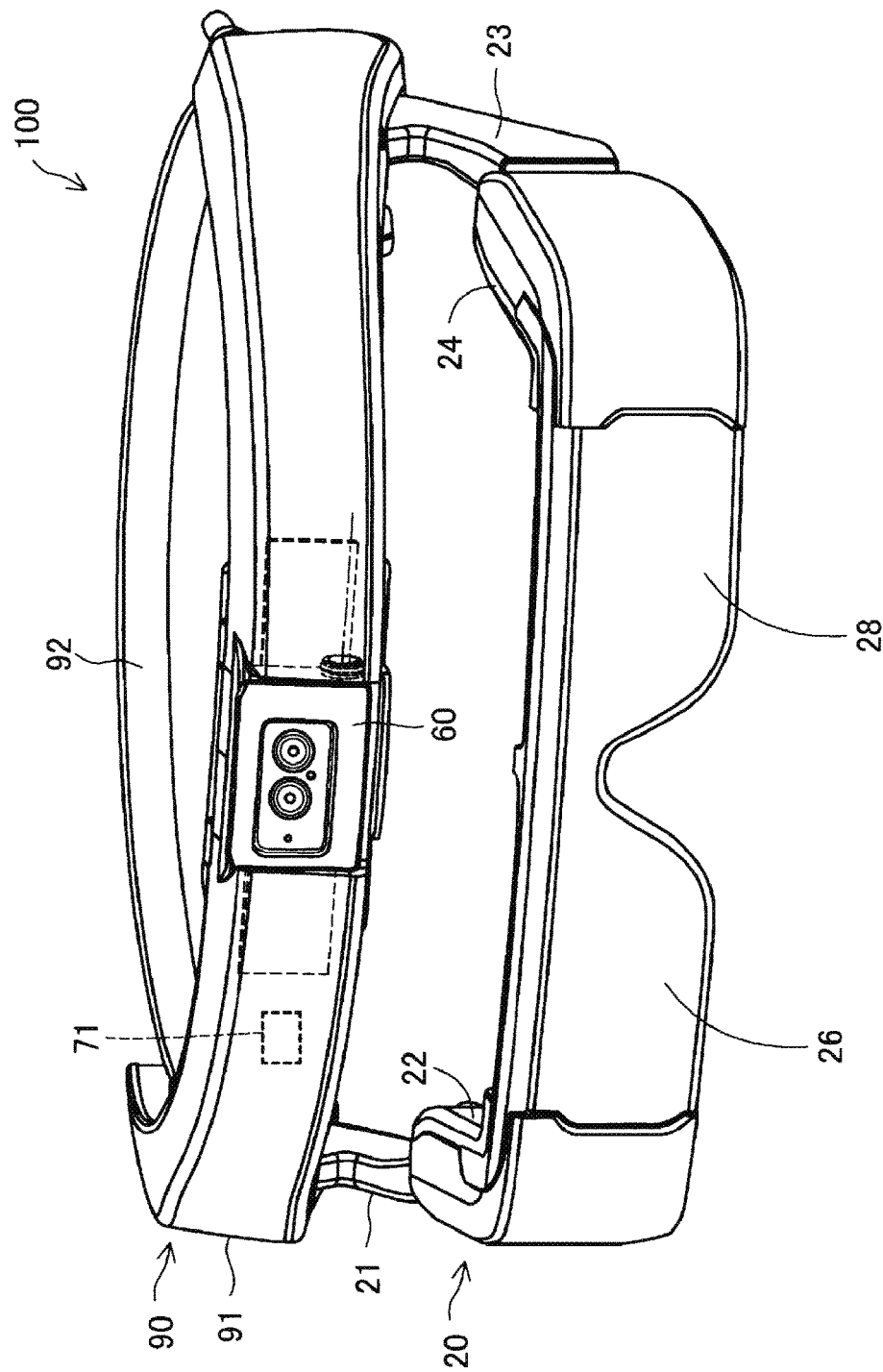
FIG. 1 is a diagram illustrating an exterior configuration of an HMD.
Figure 2:
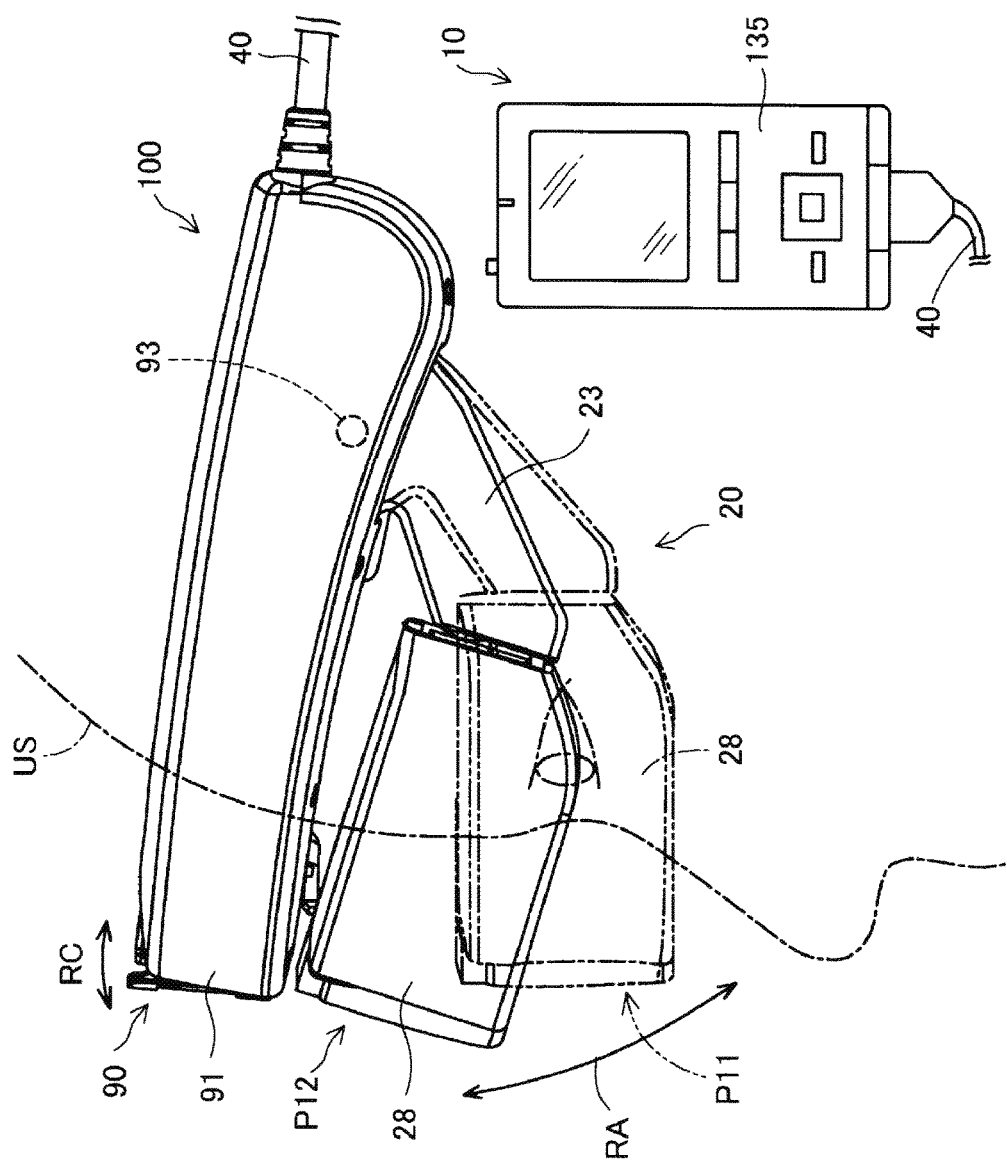
FIG. 2 is a diagram illustrating an exterior configuration of the HMD.
Figure 3:
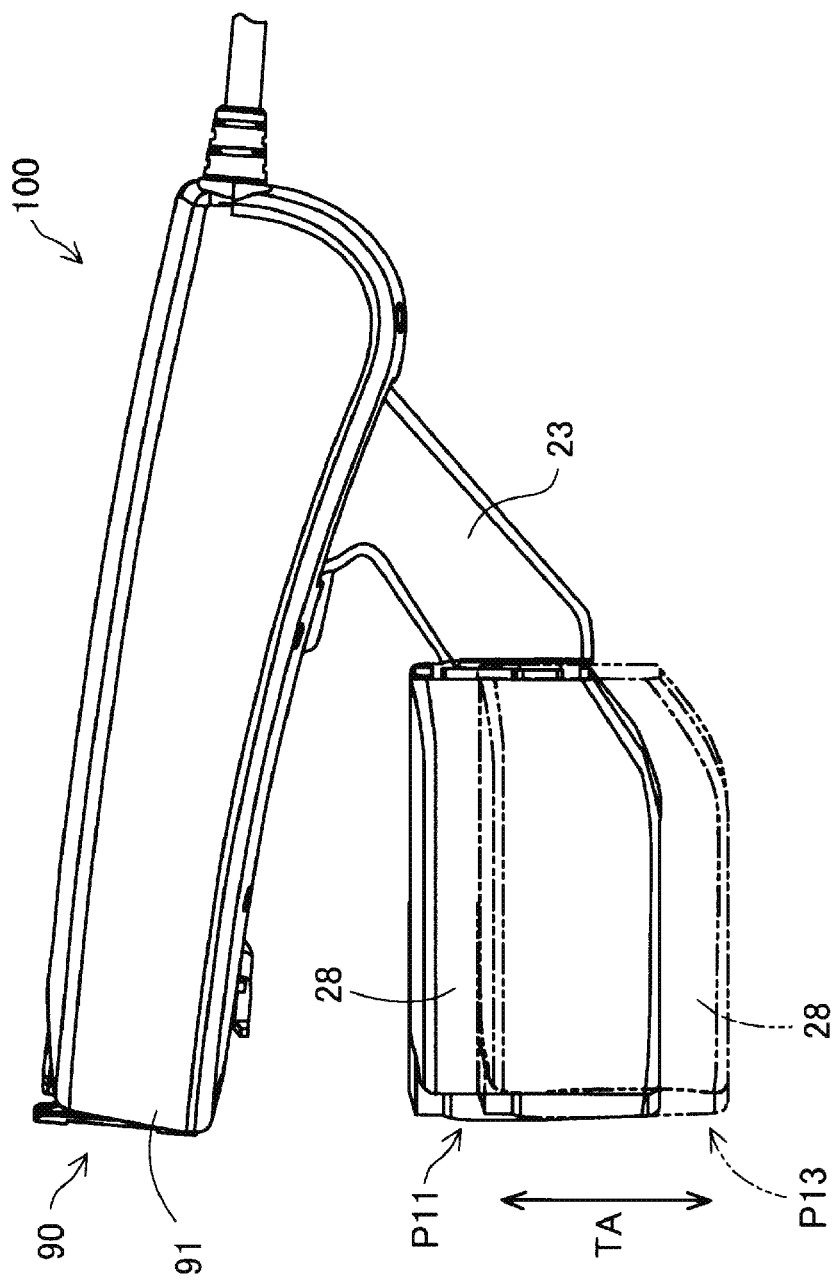
FIG. 3 is a diagram illustrating an exterior configuration of the HMD.

FIGS. 1 to 3 are diagrams illustrating an exterior configuration of a head-mounted display device 100 (HMD 100). The HMD 100 can make a user visually perceive a di play image displayed on an image display section 20 and can make the user visually perceive an outside scene by light from the outside scene passing through the image display section 20 (FIG. 1). Although a detailed configuration thereof will be described later, the HMD 100 according to the present embodiment includes image display sections corresponding to the right and left eyes of a user wearing the image display section 20 to thereby allow the user's right and left eyes to visually perceive separate images.

As illustrated in FIG. 2, the HMD 100 includes a mounting band 90 mounted on the head-mounted display device of a user, the image display section 20 connected to the mounting band 90, a control section 10 controlling the image display section 20, and a connection portion 40 connecting the control section 10 and the mounting band 90 to each other. As illustrated in FIG. 1, the mounting band 90 includes a mounting base portion 91 made of a resin, a belt portion 92 made of cloth and connected to the mounting base portion 91, a camera 60, and an IMU 71. The mounting base portion 91 has a shape curved in accordance with the shape of a human's sinciput. The belt portion 92 is a belt to be mounted to the vicinity of a user's head. Meanwhile, the connection portion 40 connects the mounting band 90 and the control section 10 side to each other in a wired manner, but the connected portion therebetween is not illustrated in FIG. 2.

The camera 60 is capable of imaging an outside scene and is disposed at the central portion of the mounting base portion 91. In other words, the camera 60 is disposed at a position corresponding to the center of a user's forehead with the mounting band 90 mounted on the user's head. For this reason, the camera 60 images an outside scene which is scenery on the outside in a direction of a user's eye gaze direction in a state where the user wears the mounting band 90 on his or her head, and acquires the captured image As illustrated in FIG. 2, the camera 60 is movable with respect to the mounting base portion 91 in a predetermined range along an arc RC. In other words, the camera 60 can change an imaging range in a predetermined range.

The IMU 71 (inertial measurement unit) is an inertial sensor that detects an acceleration. In addition, the IMU 71 of the present embodiment can detect an angular velocity and a terrestrial magnetism, in addition to the acceleration. The IMU 71 is built in the vicinity of the camera 60 in the mounting base portion 91. For this reason, the IMU 71 detects an acceleration, angular velocity, and terrestrial magnetism of the mounting band 90.

As illustrated in FIG. 2, the image display section 20 is connected to the mounting base portion 91 through a coupling portion 93 and has a shape of a pair of spectacles. The coupling portions 93 are respectively disposed on both sides of the mounting base portion 91 and the image display section 20 so as to be symmetrical to each other, and the position of the image display section 20 with respect to the mounting base portion 91 is movably supported along the arc RA centering on the coupling portion 93. In FIG. 2, a position P11 indicated by a two-dot chain line is the lowermost position of the image display section 20 along the arc RA. In addition, a position P12 indicated by a solid line in FIG. 2 is the uppermost position of the image display section 20 along the arc RA.

In addition, as illustrated in FIG. 3, optical image display sections 26 and 28 including a display panel capable of displaying an image move in parallel with respect to holding sections 21 and 23 along a straight line TA in a predetermined range to thereby change their positions. In FIG. 3, a position P13 indicated by a two-dot chain line is the lowermost position of the optical image display sections 26 and 28 along the straight line TA. In FIG. 3, a position P11 indicated by a solid line is the uppermost position of the optical image display sections 26 and 28 along the straight line TA. Meanwhile, the position P11 in FIG. 2 and the position P11 in FIG. 3 indicate the same position.

As illustrated in FIG. 1, the image display section 20 includes the right holding section 21, a right display driving section 22, the left holding section 23, a left display driving section 24, the right optical image display section 26, and the left optical image display section 28. The right optical image display section is disposed so as to be positioned in front of a user's right eye when the user wears the image display section 20. The left optical image display section 28 is disposed so as to be positioned in front of the user's left eye when the user wears the image display section 20. An end of the right optical image display section 26 and an end of the left optical image display section 28 are connected to each other at a position corresponding to a user's glabella when the user wears the image display section 20.

The right holding section 21 is a member which is provided so as to extend to the coupling portion 93 connected to the mounting base portion 91 from the other end of the right optical image display section 26. Similarly, the left holding section 23 is a member which is provided so as to extend to the coupling portion 93 from the other end of the left optical image display section 28. The right display driving section 22 and the left display driving section 24 are disposed on sides corresponding to a user's head when the user wears the image display section 20.

The display driving sections 22 and 24 include liquid crystal displays 241 and 242 (hereinafter, also referred to as "LCDs 241 and 242") to be described later in FIG. 4, projection optical systems 251 and 252, and the like. Configurations of the display driving sections 22 and 24 will be described in detail late The optical image display sections 26 and 28 include light guiding plates 261 and 262 (see FIG. 4) and a light control plate which will be described later. The light guiding plates 261 and 262 are formed of a light transmissive resin material or the like, and guide image light which is output from the display driving sections 22 and 24 to a user's eyes. The light control plate is an optical element having a thin plate shape, and is disposed so as to cover the front side of the image display section 20 which is opposite to a side of a user's eyes. The light transmittance of the light control plate is adjusted, and thus it is possible to adjust the easiness of visual recognition of an imaginary image by adjusting the amount of external light entering a user's eyes.

The control section 10 is an apparatus for controlling the HMD 100. The control section 10 includes an operation input section 135 including an electrostatic track pad, a plurality of buttons capable of being pressed, or the like.

Figure 4:
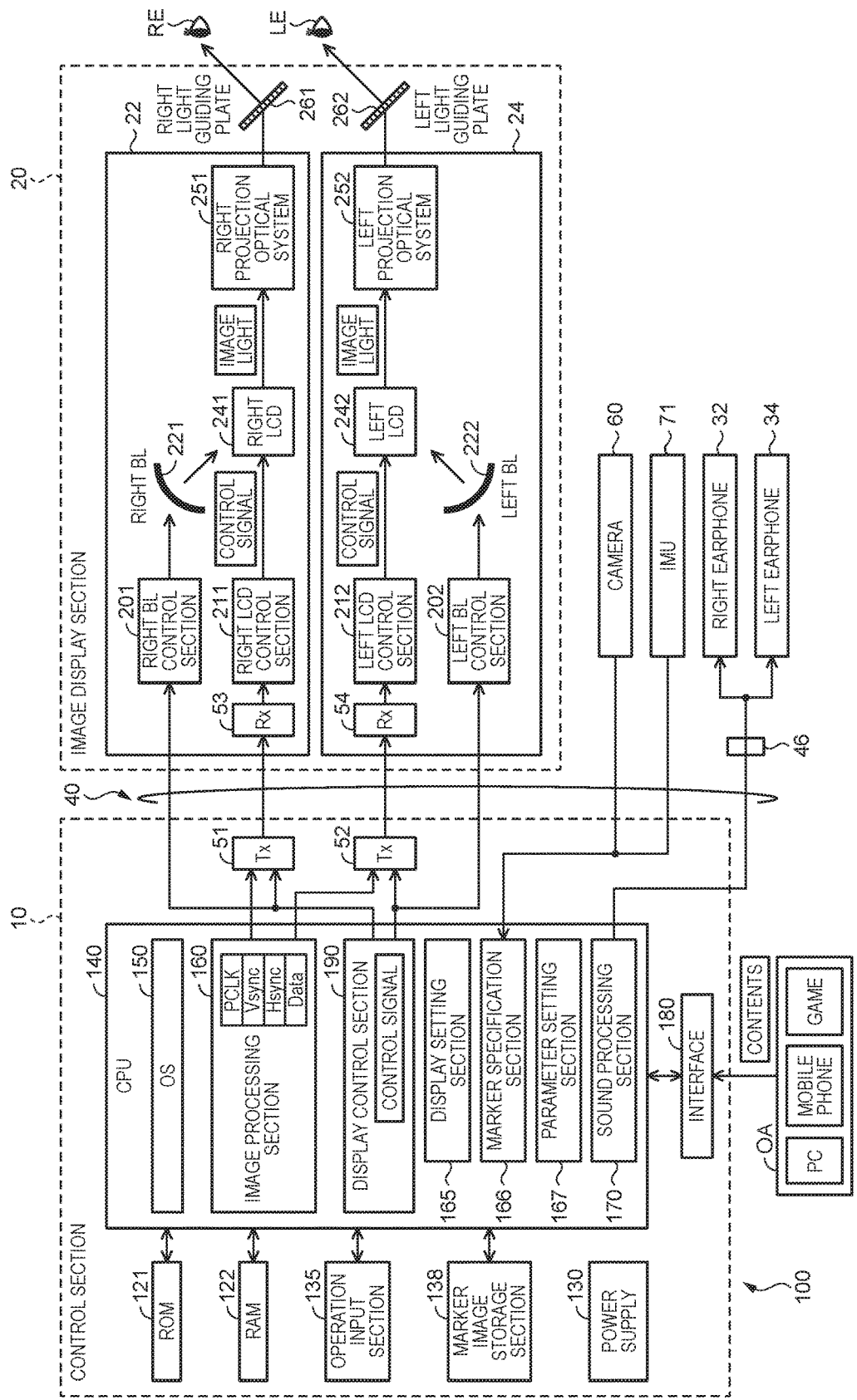
FIG. 4 is a functional block diagram of the HMD.

FIG. 4 is a functional block diagram illustrating a configuration of the HMD 100. As illustrated in FIG. 4, the control section 10 includes a ROM 121, a RAM 122, a power supply 130, an operation input section 135, a marker image storage section 138, a CPU 140, an interface 180, a transmission section 51 (Tx51), and a transmission section 52 (Tx52).

The power supply 130 supplies power to each section of the HMD 100. The ROM 121 stores various programs. The CPU 140 to be described later expands various types of programs stored in the ROM 121 to the RAM 122 to thereby execute the various types of programs.

The marker image storage section 138 stores data of a model marker (also referred to as a marker model) which is used for calibration and/or a marker image IMG as an image for calibration which is displayed on the right optical image display section 26 or the left optical image display section 28. The marker image storage section 138 may store a marker image displayed on the right optical image display section 26 and a marker image displayed on the left optical image display section 28 as the same marker image IMG. Examples of the marker image IMG to be used include an image of a two-dimensional model marker, data of the above-mentioned model marker (2D) expressed in a three-dimensional model space (3D computer graphic space), or the model marker which is projected on the basis of projection parameters of the right optical image display section 26 and the left optical image display section 28. In other words, the marker image IMG is an image obtained by two-dimensionally expressing the shape of a two-dimensional or three-dimensional real marker MK1 which is present as a real object.

Figure 5:
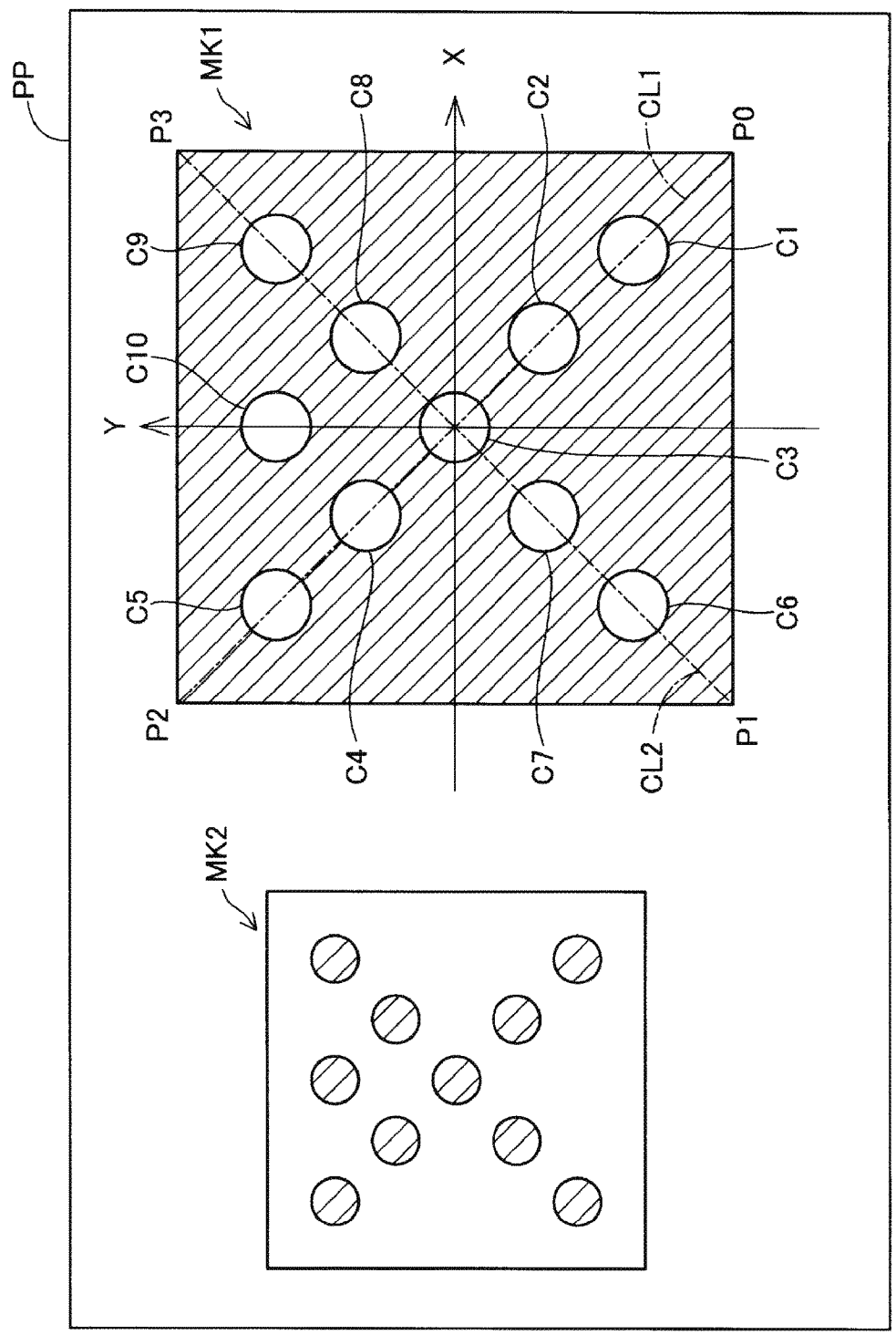
FIG. 5 is a diagram illustrating real markers.

FIGS. 5 to 8 illustrate two-dimensional real markers printed on paper PP. FIG. 5 illustrates real markers MK1 and MK2 as two markers that are used for calibration according to the present embodiment. As illustrated in FIG. 5, the real marker MK1 is a marker including ten circles in a square formed by connecting four vertexes P0, P1, P2, and P3 by a straight line. The centers of five circles among the ten circles are present on a diagonal line CDL connecting the vertex P0 and the vertex P2. The five circles are circles C1, C2, C3, C4, and C5 from a circle close to the vertex P0 along the diagonal line CL1. Similarly, the centers of five circles among the ten circles are present on a diagonal line CL2 connecting the vertex P1 and the vertex P3. The five circles are circles C6, C7, C3, C8, and C9 from a circle close to the vertex P1 along the diagonal line CL2. The circle C3 is on an intersection between the diagonal line CL1 and the diagonal line CL2 and is a circle centering on a point which is the centroid of the square. A circle C10 which is one circle among the ten circles, passes through the centroid of the square and has a center on the Y-axis which is parallel to a straight line connecting P1 and P2. The circle C10 passes through the centroid of the square and has a center at the same position as those of the circles C5 and C9 along the X-axis perpendicular to the Y-axis. In other words, the circle C10 is a circle having a center between the center of the circle C5 and the enter of the circle C9.

In the present embodiment, distances between the centers of circles adjacent to each other in five circles having the center on the diagonal line CL1 are set to be the same as each other. Similarly, distances between the centers of circles adjacent to each other in five circles having the center on the diagonal line CL2 are set to be the same as each other. In addition, a distance between the centers of circles, having the center on the diagonal line CL1, which are adjacent to each other and a distance between the centers of circles, having the centeron the diagonal line CL2 which are adjacent to each other are the same distance. Meanwhile, only the circle C10 among the ten circles differs from the other circles in a distance between the center thereof. The sizes of the ten circles are the same as each other. Meanwhile, the diagonal line CL1, the diagonal line CL2, the X-axis, and the Y-axis are illustrated in FIG. 5 for convenience of description of the real marker MK1, and are straight lines that are not included in a real marker MK1.

In FIG. 5, a difference in color is illustrated by changing hatching. Specifically, a hatched portion in 5 is black in color, and the other portions are white in color. For this reason, as illustrated in FIG. 5, the real marker MRI is formed of a black square, which is surrounded with a white color, on white paper PP, and white ten circles are formed in the square.

Figure 6:
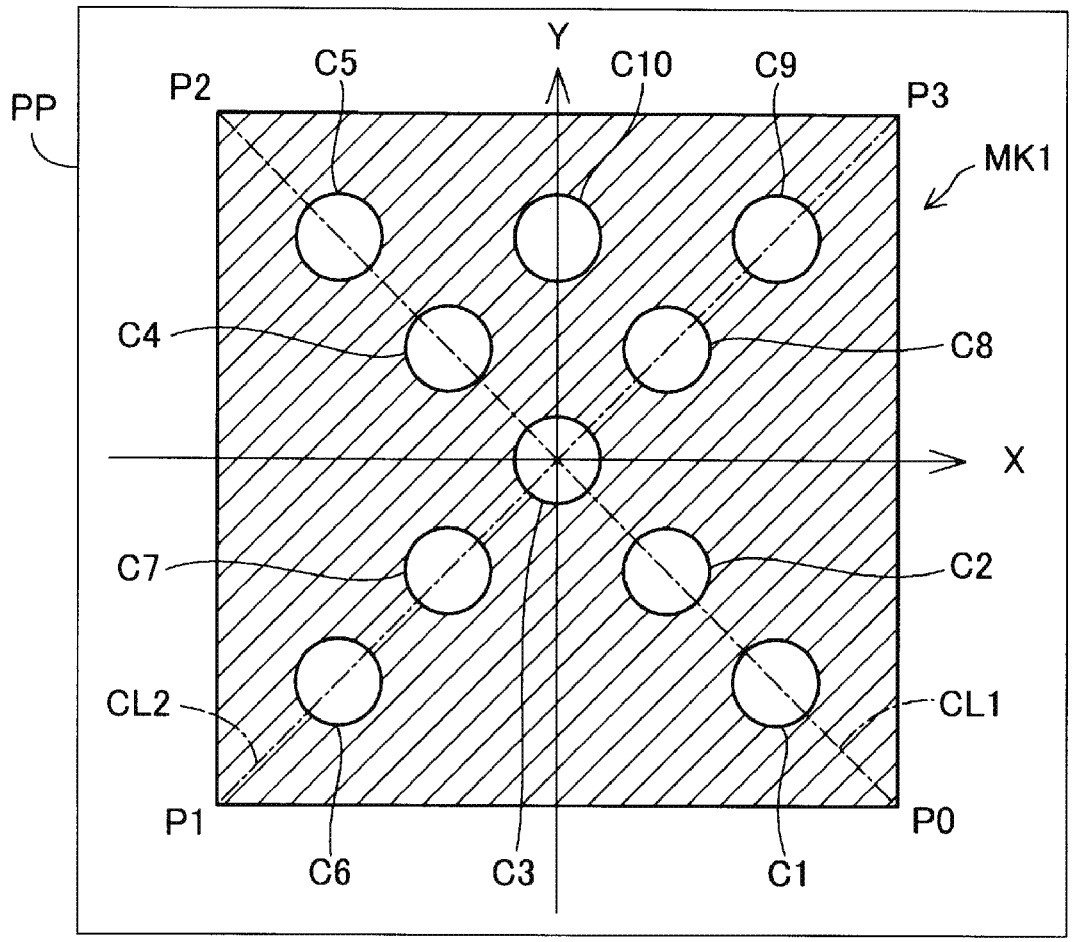
FIG. 6 is a diagram illustrating a real marker.
Figure 7:
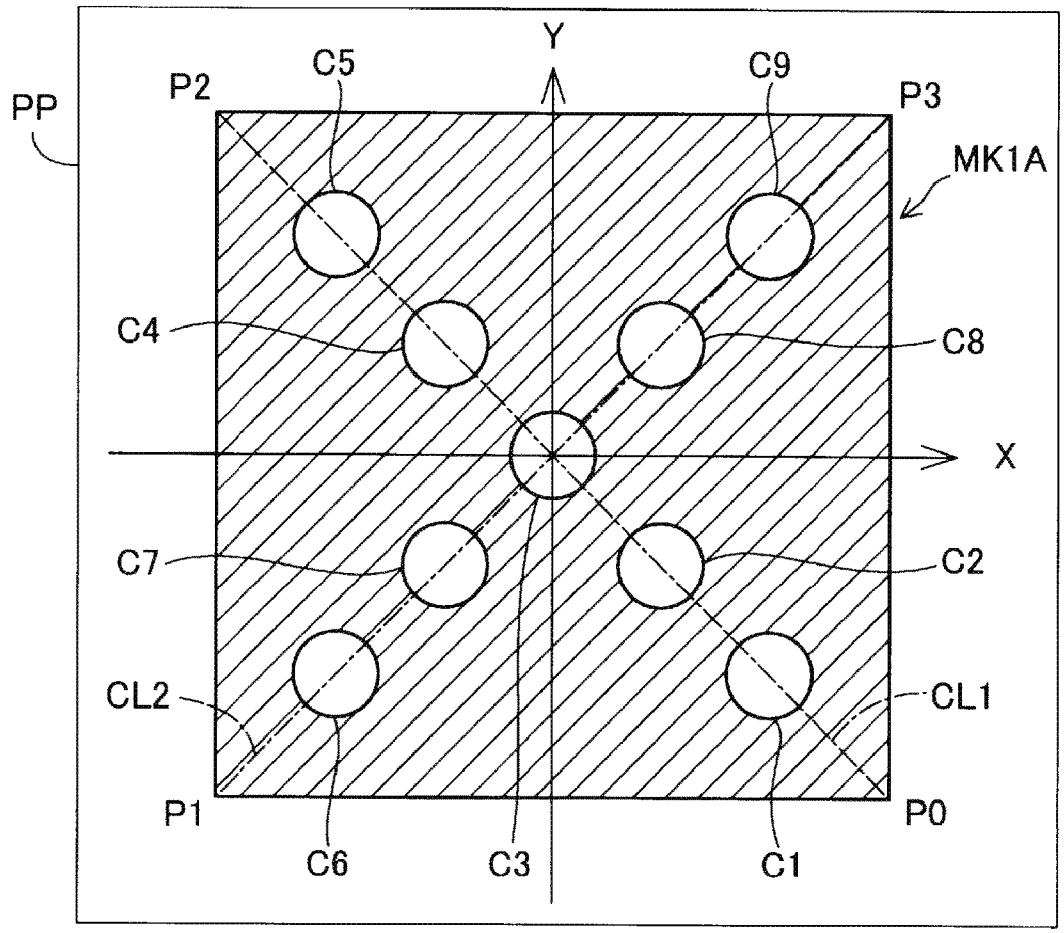
FIG. 7 is a diagram illustrating a real marker.
Figure 8:
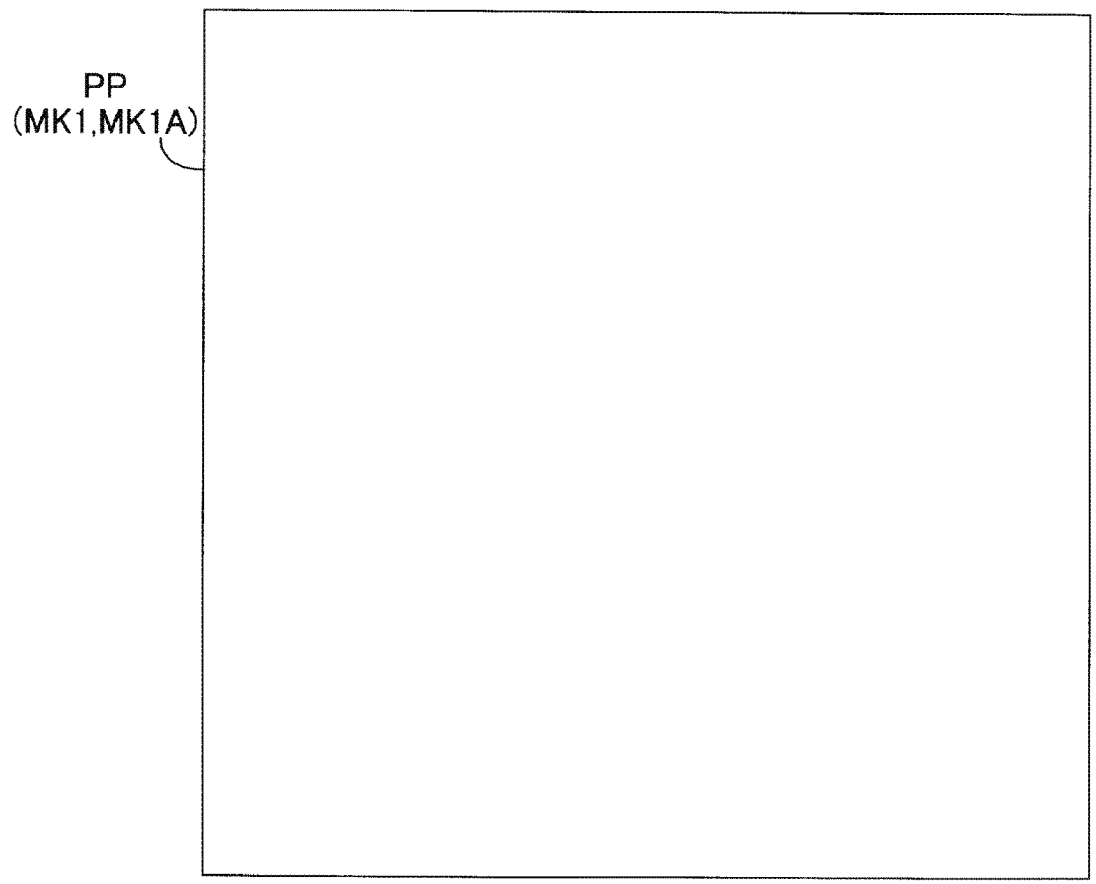
FIG. 8 is a diagram illustrating a real marker.

The real marker MK2 illustrated in FIG. 5 is a marker which is created on the basis of the real marker MK1. The real marker MK2 is a marker obtained by reducing the size of the real marker MK1 and reversing a black color and a white color. For this reason, as illustrated in FIG. 5, the real marker MK2 is formed by a white square surrounded by a black color illustrated with a black line, and black ten circles are formed in the square. In the present embodiment, the marker image storage section 138 stores a marker image IMG which is a two-dimensional image of the real marker MK1. Meanwhile, as illustrated in FIG. 6, a real marker MK2 maybe separated from a real marker MK1. In addition, as illustrated in FIG. 7, a real marker MK1A that does not include a circle, which is not present on a diagonal line, may be adopted instead of a real marker MK2 (MK1). Meanwhile, as illustrated in FIG. 8, the rear faces of real markers MK1, MK2, and MK1A are not required to have features of a shape, a pattern, or a color.

The CPU 140 illustrated in FIG. 4 expands programs stored in the ROM 121 to the RAM 122 to thereby function as an operating system 150 (OS 150), a display control section 190, a sound processor 170, an image processor 160, a display setting section 165, a marker specification section 166, and a parameter setting section 167.

The display control section 190 generates a control signal for controlling the right display driving section 22 and the left display driving section 24. The display control section 190 controls the generation and emission of image light by each of the right display driving section 22 and the left display driving section 24. The display control section 190 transmits each of control signals for a right LCD control section 211 and a left LCD control section 212 through transmission sections 51 and 52. In addition, the display control section 190 transmits each of control signals for a right backlight control section 201 and a left backlight control section 202.

The image processor 160 acquires an image signal included in contents, and transmits the acquired image signal to reception sections 53 and 54 of the image display section 20 through the transmission sections 51 and 52. The sound processor 170 acquires a sound signal included in contents, amplifies the acquired sound signal, and provides the amplified signal to a speaker (not illustrated) within a right earphone 32 and a speaker (not illustrated) within a left earphone 34 which are connected to a coupling member 46.

The display setting section 165 displays a marker image IMG based on the data stored in the marker image storage section 138 on the right optical image display section 26 or the left optical image display section 28. When calibration is executed (during the execution of calibration), the display setting section 165 controls a case where the marker image IMG is displayed on the right optical image display section 26 and a case where the marker image IMG is displayed on the left optical image display section 28 on the basis of an operation received by the operation input section 135. The display setting section 165 displays marker images IMG, which having different sizes when the camera 60 images the real marker MK1 and executes calibration and when the camera 60 images the real marker MK2 and executes calibration, on the right optical image display section 26 or the left optical. image display section 28. In addition, the display setting section 165 displays a character image to be described later, or the like on the optical image display sections 26 and 28 during the execution of calibration.

In a case where a captured image obtained by the camera 60 includes paper PP on which the real markers MK1 and MK2 are printed, the marker specification section 166 specifies the real markers MK1 and MK2 from the imaged paper PP. Although a specific process for specifying the real markers MK1 and MK2 will be described later, the marker specification section 166 extracts coordinate values of four vertexes and ten circles of the real markers MK1 and MK2 to thereby specify the real markers MK1 and MK2 from the captured image. For example, the marker specification section 166 distinguishes between black and white portions in the real markers MK1 and MK2 by binarizing a gradation value of the color of the captured image to thereby extract coordinates of the centers of the circles.

The parameter setting section 167 sets parameter groups required to set the position of an augmented reality (AR) image, which is displayed on the optical image display sections 26 and 28 in a state of being associated with a specific object imaged by the camera 60 (hereinafter, also referred to as a "specific object"), and the like within a display region. Specifically, the parameter setting section 167 sets parameter groups for making a user visually perceive the AR image in a state where at least one of the position, size, orientation, and depth perception of the AR image displayed on the optical image display sections 26 and 28 is associated with at least one of the position, size, orientation, and depth perception of the specific object. In other words, the parameter setting section 167 computes at least one of the parameter groups for associating a three-dimensional coordinate system (3D) having the origin fixed to the camera 60 with a display region (2D) of the optical image display sections 26 and 28, by calibration. Meanwhile, hereinafter, a three-dimensional coordinate system having the origin fixed to the camera 60 is referred to as a camera coordinate system. In the present embodiment, as a coordinate system other than the camera coordinate system, a real marker coordinate system having the origin of the real marker MK1 or the real marker MK2 as a reference, an object coordinate system having a specific object as a reference, a display section coordinate system having the origin of the right optical image display section 26 or the origin of the left optical image display section 28 as a reference, and the like are defined.

Here, the parameter group includes a "detection system parameter set" and a "display system parameter set". The "detection system parameter set" includes a camera parameter regarding the camera 60. The "display system parameter set" includes a "transformation parameter" from 3D to 3D which indicates a spatial relationship between the camera 60 and the optical image display sections 26 and 28 and a "projection parameter" from 3D to 2D for displaying any 3D model (CG model expressed by three-dimensional coordinates) as an image (that is, 2D). These parameters are expressed in a mode of a matrix or a vector as necessary. The notation of "one parameter" may indicate one matrix or one vector, or may indicate one of a plurality of elements included in one matrix or one vector. The parameter setting section 167 derives necessary parameters in a parameter group and uses the derived parameters during the display of an AR image. As a result, the HMD 100 can make a user visually perceive the AR image through the image display section 20 in a state where at least one of the position, size, orientation, and depth perception of the AR image (AR Model) is substantially aligned with those of a specific object. In addition to these, the HMD 100 may make appearances such as color or texture aligned with each other.

When calibration is executed, the display setting section 165 displays an AR image or a setting image SIM (to be described later) on the right optical image display section 26 or the left optical image display section 28. A detailed process using the setting image SIM will be described later.

The interface 180 is an interface for connecting various external devices OA serving as content supply sources to the control section 10. Examples of the external device OA include a storage device storing an AR scenario, a personal computer ((PC), a mobile phone terminal, a game terminal, and the like. Examples of the interface 180 may include a USE interface, a micro USB interface, an interface for a memory card, and the like.

As illustrated in FIG. 4, the image display section 20 includes the right display driving section 22, the left display driving section 24, the right light guiding plate 261 as the right optical image display section 26, and the left light guiding plate 262 as the left optical image display section 28.

The right display driving section 22 includes the reception section 53 (Rx53), the right backlight control section 201 (right BL control section 201) and a right backlight 221 (right BL 221) which function as a light source, the right LCD control section 211 and the right LCD 241 which function as a display element, and the right projection optical system 251. The right backlight control section 201 and the right backlight 221 function as a light source. The right LCD control section 211 and the right LCD 241 function as a display element.

The reception section 53 functions as a receiver for serial transmission between the control section 10 and the image display section 20 o The right backlight control section 201 drives the right backlight 221 on the basis of a control signal which is input. The right backlight 221 is a light-emitting body such as an LED or an electroluminescence (EL). The right LCD control section 211 drives the right LCD 241 on the basis of a control signal which is transmitted from the image processing section 160 and the display control section 190. The right LCD 241 is a light transmissive liquid crystal panel in which a plurality of pixels are arranged in a matrix.

The right projection optical system 251 is constituted by a collimate lens that collimates image light emitted from the right LCD 241 into a parallel luminous flux. The right light guiding plate 261 as the right optical image display section 26 guides image light emitted from the right projection optical system 251 to a user's right eye RE while reflecting the image light along a predetermined light path. Meanwhile, the left display driving section 24 has the same configuration as the right display driving section 22 and corresponds to the user's left eye LE, and thus a description thereof will be omitted here.

Figure 9:
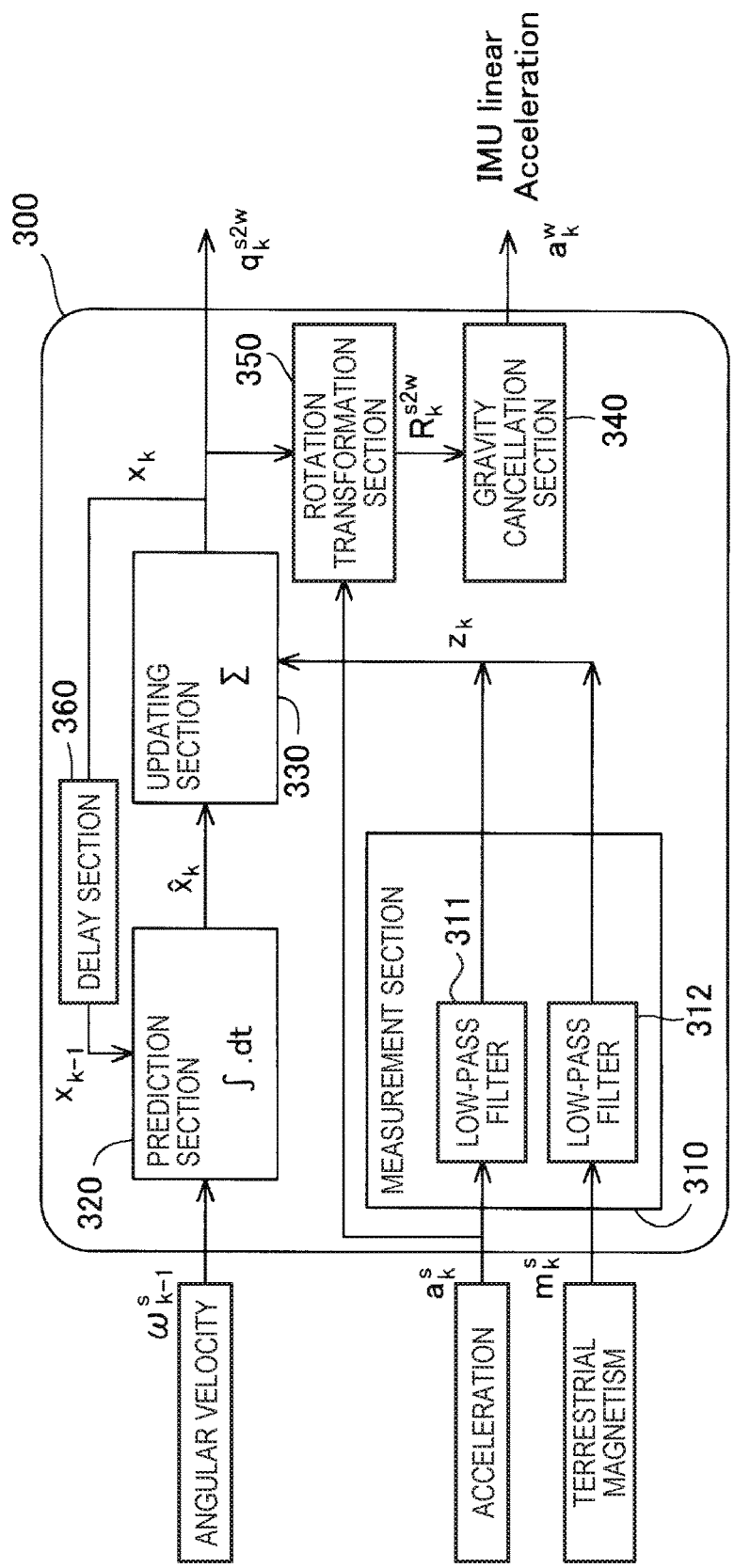
FIG. 9 is a functional block diagram illustrating a uniting section in an IMU.

FIG. 9 a illustrates a uniting section 300 in the IMU 71. The uniting section 300 may be disposed outside the IMU 71. The uniting section 300 unites measurements (values or signals) of respective internal sensors with each other on the basis of an extended Karman filter (EKF). In the present embodiment, an IMU orientation is expressed by a quaternion. The expression using a quaternion can be transformed into a rotation matrix. The extended Karman filter is applied to a state vector which is expressed as follows.

$$x=[q_{s2w}, b_{gyro}] \quad (a)$$

An input vector is determined by an input of gyro sensor.

$$u=[w^s] \quad (b)$$

A state transition model from K-1 to K between intervals Δt is expressed as the following expression.

$$x_k = f(x_{k-1}, u_{k-1}, w_{k-1}) \quad (c)$$

Here, $w_{k-1}$ denotes a noise vector.

As illustrated in FIG. 9, the uniting section 300 includes a measurement section 310, a prediction section 320, an updating section 330, a gravity cancellation section 340, a rotation transformation section 350, and a delay section 360.

The measurement section 310 functions by receiving inputs of an acceleration which is output from an acceleration sensor and measurements $a^s_k$ and $m^s_k$ terrestrial magnetisms which are output from a magnetic sensor. The measurement section 310 includes low-pass filters 311 and 312. The low-pass filter 311 reduces noise in the measured acceleration $a^s_k$. The low-pass filter 312 reduces noise in the measured terrestrial magnetism $m^s_k$.

The prediction section 320 integrates an angular velocity $\omega^s_{k-1}$ which is detected by the IMU 71 over a predetermined period of time to thereby estimate the amount of change in angle (or pose), and outputs the predicted change in angle (or pose) to the updating section 330. The updating section 330 filters, that is, unites measurements $z_k$ (acceleration and terrestrial magnetism) using the predicted change in angle (or pose). Then, the united IMU orientation $q^{s2w}_k$ is updated and output, and the united IMU orientation $q^{s2w}_k$ is fed back to the prediction section 320 through the delay section 360 for the next cycle. When the united IMU orientation $q^{s2w}_k$ is calculated, a dynamic or linear acceleration $a^w_k$ of the IMU 71 is calculated by the cancellation of gravity which is performed by the gravity cancellation section 340.

The rotation transformation section 350 receives the IMU orientation $q^{s2w}_k$, transforms the received IMU orientation into a rotation matrix $R^{s2w}_k$, and outputs the rotation matrix obtained by the transformation. The measured acceleration $a^s_k$ received from the acceleration sensor is input to the gravity cancellation section 340. The gravity cancellation section 340 cancels the acceleration of gravity of the earth using the IMU orientation expressed by the rotation matrix $R^{s2w}_k$, and calculates and outputs a linear acceleration $a^w_k$ of the IMU 71 which does not include a component of acceleration of gravity.

Adjustment for uniting detected values based on the above-mentioned extended Karman filter is performed in a plant that manufactures the HMD 100. The calibration of the camera 60 and the IMU 71 is also performed in a plant that manufactures the HMD 100.

Figure 10:
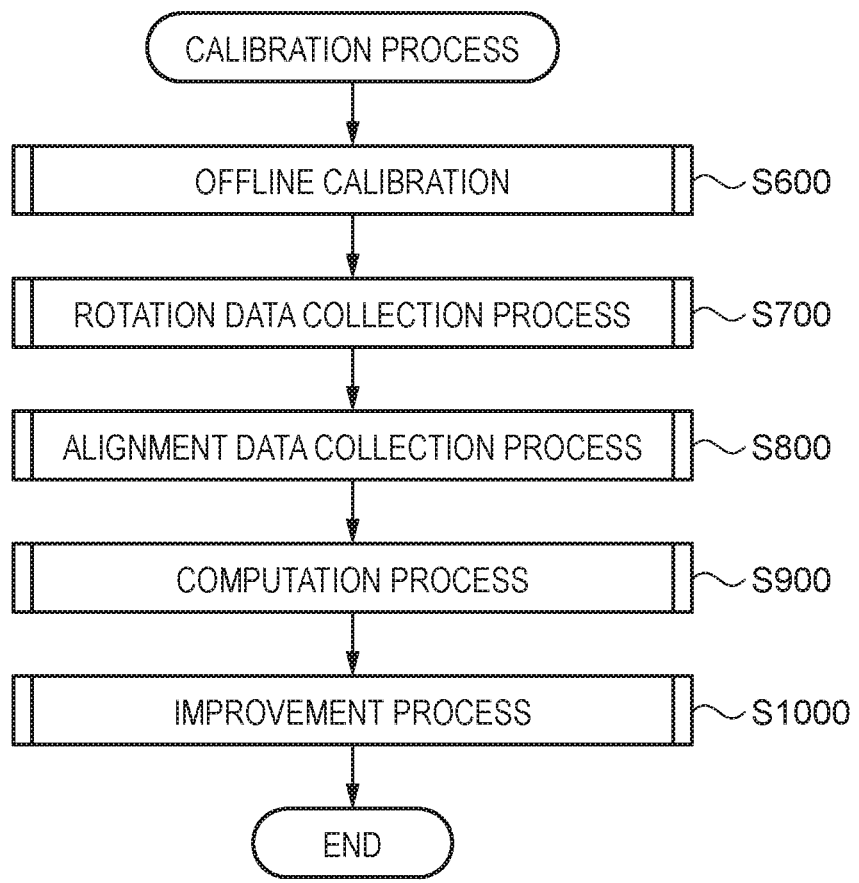
FIG. 10 is a flow chart illustrating a calibration process.

FIG. 10 is a flow chart illustrating a calibration process. This process is performed for the purpose of joint calibration. The joint calibration refers to collective obtainment of a transformation matrix $T_{cam2imu}$ and a transformation matrix $T_{cam2display}$. The transformation matrix $T_{cam2imu}$ indicates a transformation matrix (in other words, a coordinate transformation matrix) from a coordinate system fixed to the camera 60 to a coordinate system fixed to the IMU 71. The transformation matrix $T_{cam2imu}$ indicates a spatial relationship between the camera 60 and the IMU 71. The cam2imu which is the subscript means camera to imu. The determination of the transformation matrix $T_{cam2imu}$ is also referred to as IMU-camera calibration. The transformation matrix $T_{cam2imu}$ indicates a first spatial relationship in this embodiment.

The transformation matrix $T_{cam2display}$ indicates a transformation matrix from a coordinate system fixed to the camera 60 to a coordinate system fixed to the optical image display sect ions 26 and 28. The transformation matrix $T_{cam2display}$ indicates a spatial relationship between the camera 60 and the optical image display sections 26 and 28. The determination of the transformation matrix $T_{cam2display}$ also referred to as OSTC calibration. The transformation matrix $T_{cam2display}$ indicates a second spatial relationship in this embodiment.

The CPU 140 executes a program stored in the ROM 121 in response to a user's instruction, to thereby realize a calibration process. The calibration process is constituted by offline calibration (S600), a rotation data collection process S700), an alignment data collection process (S800), a computation process (S900), and an improvement process (S1000). S700, S800, S900, and S1000 are processes for online calibration.

Figure 11:
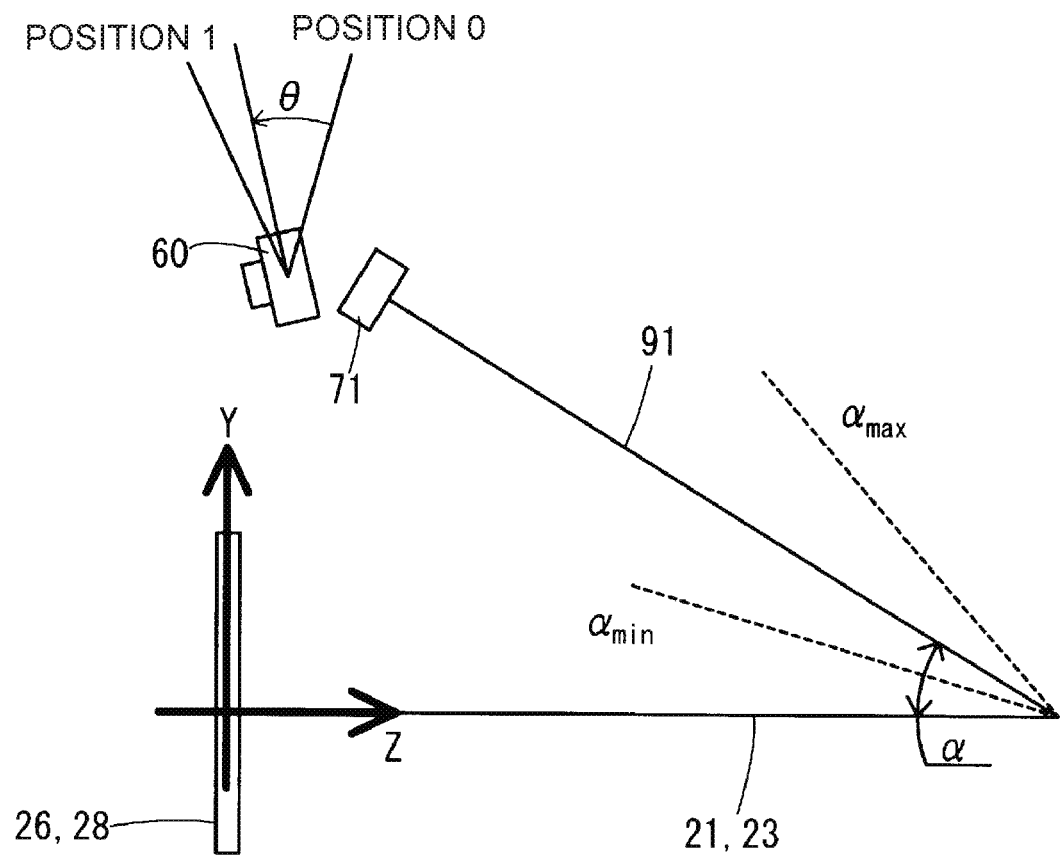
FIG. 11 is a diagram illustrating a modeled spatial relationship.

FIG. 11 illustrates a modeled spatial relationship in offline calibration. A direction perpendicular to the optical image display sections 26 and 28 is defined as a Z-direction, and a direction from the outside to a user's eye is defined as a Z-direction plus direction. The holding sections 21 and 23 are disposed on a Z-axis. An X-direction is a direction parallel to rotation axes of the holding sections 21 and 23 and the mounting base portion 91. An X-direction plus direction is a direction in which a right screw is advanced by the rotation in a direction in which a rotation angle (hereinafter, an angle α) between the mounting base portion 91 and the holding sections 21 and 23 becomes larger. A Y-direction is determined from the X-direction and the Z-direction.

The camera 60 is rotatable. The rotation axis of the camera 60 is parallel to the X-axis. The position of the camera 60 facing the uppermost position by the rotation is referred to as a position 0. The camera 60 facing upward means motion which is realized by rotating the camera 60 in a direction in which the right screw is rotated so as to advance in the X-direction plus direction. On the other hand, the position of the camera 60 facing the lowermost position is referred to as a position 1. The camera 60 facing downward means an operation which is opposite to the camera 60 facing upward. A rotation angle based on the position 0 is referred to as an angle θ. For this reason, an angle θ at the position 0 is 0 degrees. in the present embodiment, an angle θ at the position 1 is 28 degrees.

S600 is offline calibration, and is thus performed before shipment in a plant. S600 is performed in order to search for a spatial relationship and restriction conditions. The following three contents are fixed or are already known from a CAD model and manufacturing specifications.

Translational relationship between positions of the IMU 71 and the camera 60

Position of the IMU 71 on the mounting base portion 91

Positions of the right optical image display section 26 and the left optical image display section 28 on the HMD 100

As described above, the HMD 100 realizes the following operation.

The camera 60 is rotatable with respect to the mounting base portion 91 and the IMU 71.

The mounting base portion 91 is capable of being inclined with respect to the holding sections 21 and 23.

The optical image display sections 26 and 28 may move in a vertical direction (Y-direction) with respect to the holding sections 21 and 23.

A spatial relationship is modeled as follows.

An angle between the camera 60 and the IMU 71 is a function of an angle θ.

An angle between the mounting base portion 91 and the holding sections 21 and 23 or an angle between the IMU 71 and the holding sections 21 and 23 are a function of an angle α.

An angle between the holding sections 21 and 23 and the positions of two ends of the optical imaged play sections 26 and 28 is a function of a Y coordinate value of each of the optical image display sections 26 and 28.

Figure 12:
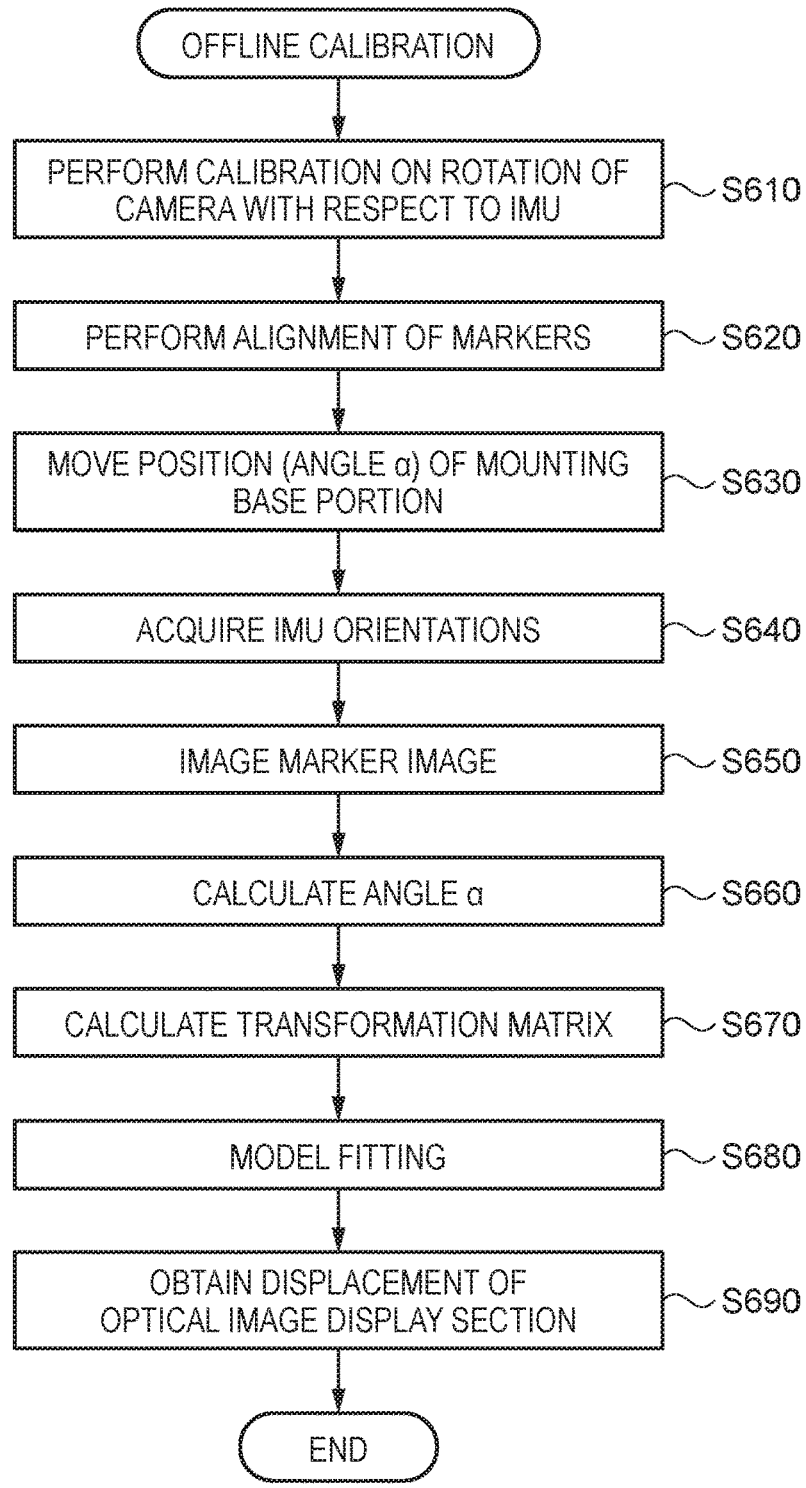
FIG. 12 is a flow chart illustrating offline calibration.

FIG. 12 is a flow chart illustrating offline calibration (S600). First, calibration (IMU-camera calibration) is performed on the rotation of the camera 60 with respect to the IMU 71 (S610). A rotational position (angle θ) between the camera 60 and the IMU 71 may vary. This is because the IMU 71 is fixed to the mounting base portion 91, while the camera 60 is movable about one axis up to 28 degrees, as described above.

A spatial relationship of the camera with respect to the IMU 71 is adjusted (calibrated) using an IMU-camera calibration toolbox, for example, an InerVis Toolbox, to thereby discretely obtain the rotational position of the camera 60.

As learning of an angular range of the camera 60, IMU-camera calibration is performed when the camera is positioned at two ends (position 0 and position 1).

Assuming that rotation between the IMU 71 and the camera 60 at the position 0 is $q_0$ by the expression of a quaternion, and rotation between the IMU 71 and the camera 60 at the position 1 is $q_1$ by the expression of a quaternion, a change in the rotation between the two positions is expressed by the following expression.

$$q = q_0^{-1} q_1 \tag{d}$$

and $$q = q_w + q_x i + q_y j + q_z k \tag{e}$$

A range of the rotation of the IMU 71 with respect to the camera 60 is $\theta = 2a \cos(q_w)$. When the center axis of rotation is expressed by a unit vector, the following expression is established.

$$[u_x, u_y, u_z] = [q_x, q_y, q_z]/\sqrt{(q_x^2 + q_y^2 + q_z^2)} \tag{f}$$

Then, any angle of the camera between the position 0 and the position 1 of the orientation of the IMU 71 with respect to the camera 60 is obtained by the following interpolation expression.

$$q_{cam2imu}(t\theta) = q_0^{-1} q(t\theta), \; t \in [0, 1] \tag{g}$$

$$q(t\theta) = \cos(t\theta/2) + \{\sin(t\theta/2)\}(u_x i + u_y j + u_z k) \tag{h}$$

S620 to S670 are steps for estimating a transformation matrix $T_{imu2d0}(\alpha)$. The transformation matrix $T_{imu2d0}(\alpha)$ is a transformation matrix from a coordinate system of the IMU 71 to coordinate systems of the optical image display sections 26 and 28 at a default position d0. The transformation matrix $T_{imu2d0}(\alpha)$ is determined on the basis of an angle α. As described above, the angle α is variable within a range of $[\alpha_{min}, \alpha_{max}]$.

Figure 13:
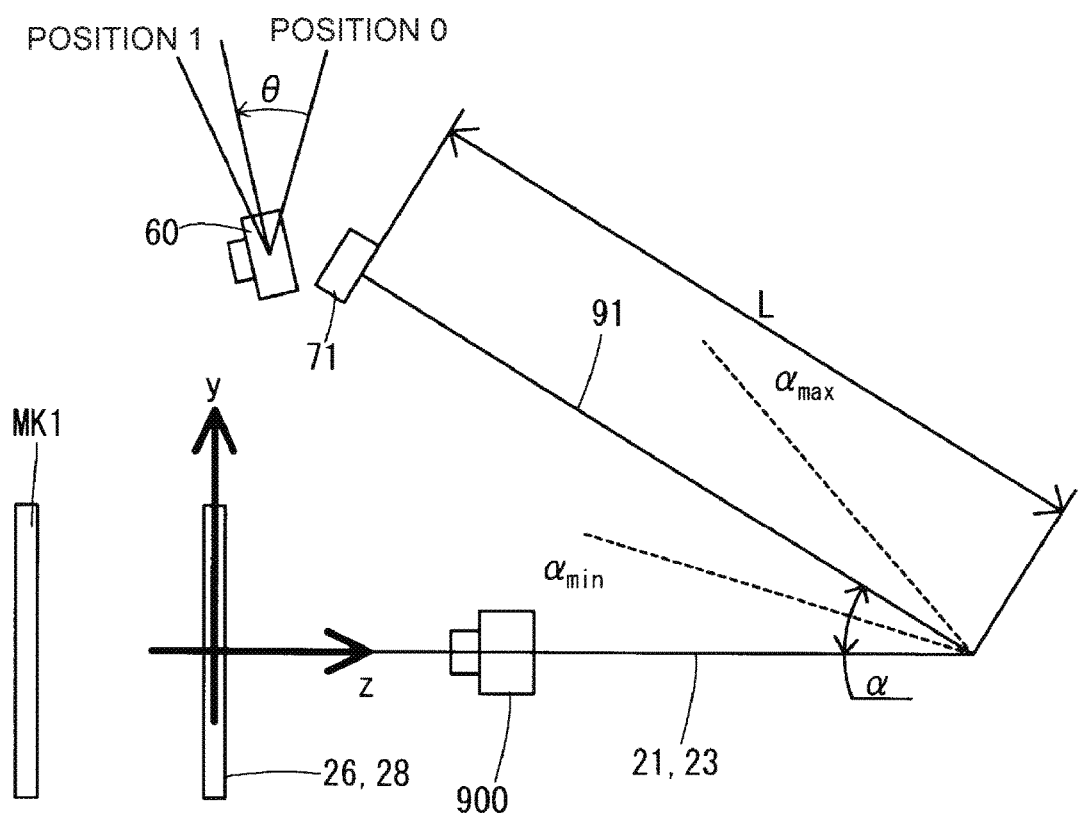
FIG. 13 is a diagram illustrating a configuration of an apparatus for offline calibration.

FIG. 13 illustrates a configuration of the device for executing S620 to S670. FIG. 13 is a diagram based on FIG. 11. A real marker MK1 and a camera 900 are added to the contents of FIG. 11. In the configuration illustrated in FIG. 13, the holding sections 21 and 23 are fixed to a tripod, and the optical image display sections 26 and 28 are disposed at the default position d0. Meanwhile, the tripod is not limited to standing vertically. When the tripod does not stand vertically, the holding sections 21 and 23 are not in a horizontal state.

In S620, the real marker MK1 is aligned. A user views an image capable of being observed by the camera 900 installed on the back of the optical image display sections 26 and 28 and determines the arrangement of the real marker MK1 so that marker images displayed on the optical image display sections 26 and 28 are viewed to be superimposed on the real marker MK1. This arrangement is performed on the condition that the optical image display sections 26 and 28 and the real marker MK1 are parallel to each other. Even after the alignment is established, the marker image is continuously displayed.

Next, the position (angle α) of the mounting base portion 91 is changed (S630). In the present embodiment, a user moves the mounting base portion from $\alpha_{max}$ toward $\alpha_{min}$. In S630, the CPU 140 sequentially acquires IMU orientations (S640). In other words, IN S640, an IMU orientation is acquired at each discrete position (angle α) of the mounting base portion 91, and the orientation of the IMU 71 in a local coordinate system is calculated.

Here, the entire measurement is started at a time $t_{min}$ when the mounting base portion 91 is positioned farthest away from the optical image display sections 26 and 28 and is terminated at a time $t_{max}$ when the mounting base portion is positioned closest to the optical image display sections, on the basis of the method of changing the angle α in S630. The orientation of the IMU 71 is acquired as the following set.

$$R_{imu2world}(t_{min}) \ldots R_{imu2world}(t_i) \ldots R_{imu2world}(t_{max}) \tag{i}$$

In S630, the CPU 140 images the real marker MK1 by the camera 60 (S650). In S650, the camera is located at the position 0 or the position 1, or is located at both the positions. In other words, in S630, the camera 60 is fixed to any one of the position 0 and the position 1 and successively performs imaging. In order to perform imaging at both the position 0 and the position 1, S630 is performed twice.

Next, the CPU 140 calculates an angle α at each sampling position (S660). The angle α is calculated as a difference in angle between $R_{imu2world}$ and $R_{imu2world}\ t_{min}$).

Here, expressions listed below are established, and an angle α is obtained:

$$\alpha_{min}=0 \tag{j}$$

$$\alpha_i = a\ \cos([\text{trace}\{R_{imu2world}(t_{min})^{-1} * R_{imu2world}(t_i)\}-1]/2) \tag{k}$$

$$\alpha_{max} = a\ \cos([\text{trace}\{R_{imu2world}(t_{min})^{-1} * R_{imu2world}(t_{max})\}-1]/2) \tag{l}$$

Next, the CPU 140 calculates a transformation matrix $T_{imu2d0}$ (α) (S670) The transformation matrix $T_{imu2d0}$ (α) can be calculated by the following expression.

$$T_{imu2d0}(\alpha_i) = T_{maker2display} T_{cam2marker}(\alpha_i) T_{imu2cam} \tag{m}$$

Here, $T_{maker2display}$ is a matrix indicating pose which is determined in advance, as the pose of a marker image displayed in S620. $T_{cam2marker}$ a matrix indicating the pose of the real marker MK1 which is estimated from the processing of a captured image. $T_{imu2cam}$ indicates a matrix indicating a parameter of IMU-camera calibration at the position 0 or the position 1. The position 0 and the position I are determined in S610.

Next, the CPU 140 performs model fitting (S680). In the model fitting, a relationship between α and $T_{imu2d0}$ is modeled. In other words, $T_{imu2d0}$ as a function of a is determined. In S680, the orientation α (S660) of the IMU 71 at each sampling point (each angle α which is discretely acquired) and a calculation result (S670) of the transformation matrix $T_{imu2d0}$ are used. In this manner, since an actual measurement value is used in S680, the model fitting is not performed completely but is performed roughly.

In S680, for example, functions listed below are used.

$$T_{imu2d0}(\alpha_i) = [q(\alpha_i), t(\alpha_i)] \tag{n}$$

Meanwhile, $q(\alpha_i)$ included in the above-mentioned expression denotes a component of rotation, and $t(\alpha_i)$ denotes a component of translation.

$$\text{rotation axes } [U_x, U_y, U_z] \text{ of angle } \alpha \tag{o}$$

Here, [Ux,Uy,Uz] in the above-mentioned expression are vectors.

$$q_{imu2display}(\alpha_i) = q_0 q(\alpha_i) \tag{p}$$

In a case of the above-mentioned expression, the optical image display sections 26 and 28 may not be perpendicular to the ground surface. In other words, the Y-direction may not be consistent with a vertical direction. In other words, the Z-direction may not be in a horizontal state.

$$t_x(\alpha_i) = t_x(0) \tag{q}$$

$$t_y(\alpha_i) = t_y(0) + L\sin(\alpha) \tag{r}$$

In a case of the above-mentioned expression, it is assumed that the optical image display sections 26 and 28 are perpendicular to the ground surface. Here, L included in the above-mentioned expression is a distance between the IMU 71 and the center of rotation, as illustrated in FIG. 13. The wording "the center of rotation" as mentioned herein refers to the center of rotation of the holding sections 21 and 23 and the mounting base portion 91.

$$t_z(\alpha_i) = t_z(0) + L\{1-\cos(\alpha)\} \tag{s}$$

In a case of the above-mentioned expression, the optical image display sections 26 and 28 may not be perpendicular to the ground surface.

$$\alpha = k\alpha_t + b \tag{t}$$

Here, k and b included in the above-mentioned expression are solved by model fitting.

A relationship between the transformation matrix $T_{imu2d0}$ and the angle a may also be expressed by a look-up table (LUT). The transformation matrix $T_{imu2d0}$ corresponding to the angle α may be calculated by linear interpolation of a sampling value in the LUT.

Next, the CPU 140 obtains displacements of the optical image display sections 26 and 28 (S690). The optical image display sections 26 and 28 move with respect to the holding sections 21 and 23 only in a vertical direction along the Y-axis. When the displacements of the optical image display sections 26 and 28 with respect to the default position d0 are expressed as a displacement d, the displacement d may be directly modeled as follows.

$$T_{d02d} = \begin{bmatrix} 1 & 0 & 0 & 0 \\ 0 & 1 & 0 & d \\ 0 & 0 & 1 & 0 \\ 0 & 0 & 0 & 1 \end{bmatrix} \tag{1}$$

When the offline calibration is terminated, a rotation data collection process is performed as illustrated in FIG. 10 (S700).

Figure 14:
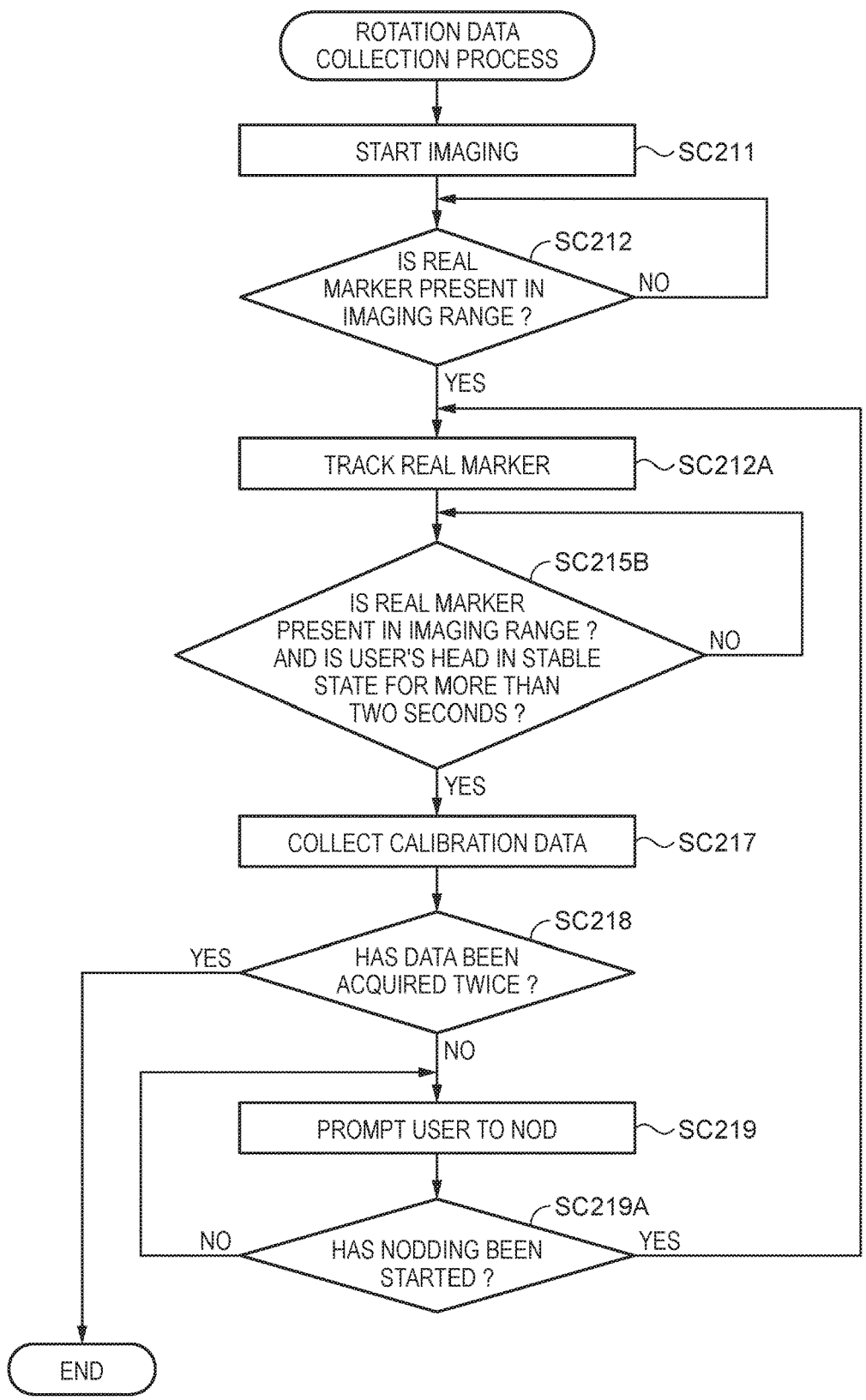
FIG. 14 is a flowchart illustrating a rotation data collection process.

FIG. 14 is a flow chart illustrating a rotation data collection process. The rotation data collection process is performed by the CPU 140. First, the marker specification section 166 starts imaging (SC211). The marker specification section 166 performs binarization on each imaged frame obtained by the camera 60 to thereby extract a real marker MK2. The marker specification section 166 determines whether or not the real marker MK2 is present in an imaging range (SC212). In a case where the marker specification section 166 determines that the real marker MK2 is not present in the imaging range (SC212, NO), the marker specification section continuously attempts to extract the real marker MK2 from the imaging range.

In a case where the marker specification section 166 determines that the real marker MK2 is present in the imaging range (SC212, YES), the marker specification section derives the position and pose of the real marker MK2 with respect to the camera 60 and starts tracking the position and the pose (SC212A).

After SC212A is performed, the parameter setting section 167 determines whether or not the real marker MK2 is present in the imaging range of the camera 60 and whether or not a user's head is in a stable state for a predetermined period of time, for example, two seconds (SC215E). The head being in a stable state means that the motion of the head is in a stop state. In a case where the parameter setting section 167 determines that the real marker is present in the imaging range of the camera 60 and that a user's head is in a stable state for two seconds (SC215B, YES), the process proceeds to SC217. In a case where the determination result in SC215B is "negative", the parameter setting section 167 continuously monitors a captured image arid the motion of the user's head until the determination result is satisfied.

The parameter setting section 167 acquires a captured image of the real marker MK2 which is obtained by the camera 60 and an IMU orientation, as calibration data (SC217). The acquired captured image may be one frame or may be a plurality of successive frames. In a case where a plurality of frames are acquired, the parameter setting section 167 performs filtering based on the plurality of frames, and thus it is possible to reduce the influence of the minute motion of the head in deriving coordinates of the centers of the above-described circles 1 to 9.

Whether the head is in a stable state or is in a substantially stop state can be determined by the parameter setting section 167 from the position of a feature point of the real marker MK2 in the captured image obtained by the camera 60, the output of the IMU 71, and a combination thereof.

Next, it is determined whether or not calibration data has been already acquired twice (SC218). In a case where calibration data has been acquired only once (SC218, NO), the user is prompted to dos a nodding operation (SC219). Specifically, the prompting is performed by a sound or the display of an image.

Then, it is determined whether or not the nodding has been started (SC219A). This determination is performed by the parameter setting section 167 on the basis of the position of a feature point of the real marker MK2 in the captured image obtained by the camera 60, the output of the IMU 71, and a combination thereof, similar to the determination whether the head is in a stable state.

In a case where the nodding has not been started (SC219A, NO), SC219 is repeatedly performed. In a case where the nodding has been started (SC219A, YES), the process returns to SC212A to perform SC212A to SC218 again.

In a case where the determination in SC218 is performed for the second time, it is determined that calibration data has been already acquired twice (SC218, YES), and the rotation data collection process is terminated.

Figure 15:
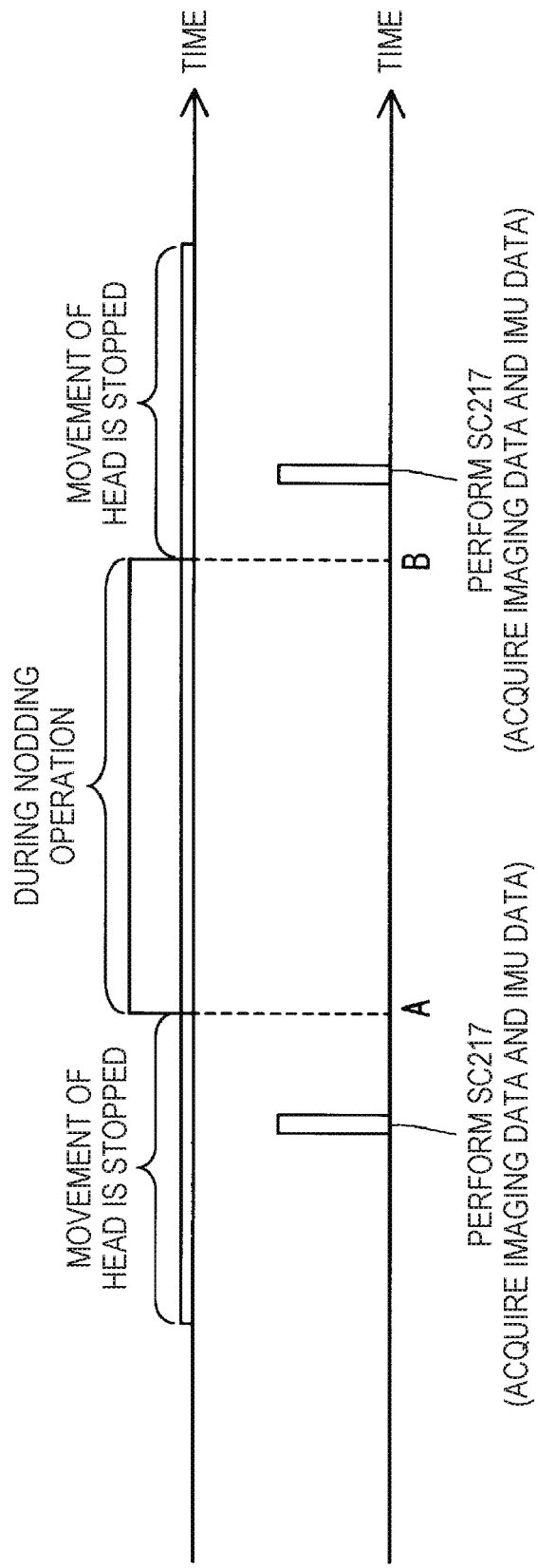
FIG. 15 is a timing chart of a rotation data collection process.

FIG. 15 is a timing chart of the rotation data collection process. FIG. 15 illustrates that data is collected during the stop of operation before and after a nodding operation, as described in FIG. 14. At a point in time of the first SC217, the relative position of the camera 60 with respect to the real market MK2 is a first position. At a point in time of the second SC217, the relative position is a second position. The real marker MK2 used in the rotation data collection process is a first real marker.

When the rotation data collection process is terminated, an alignment data collection process is performed as illustrated in FIG. 10 (S800).

Figure 16:
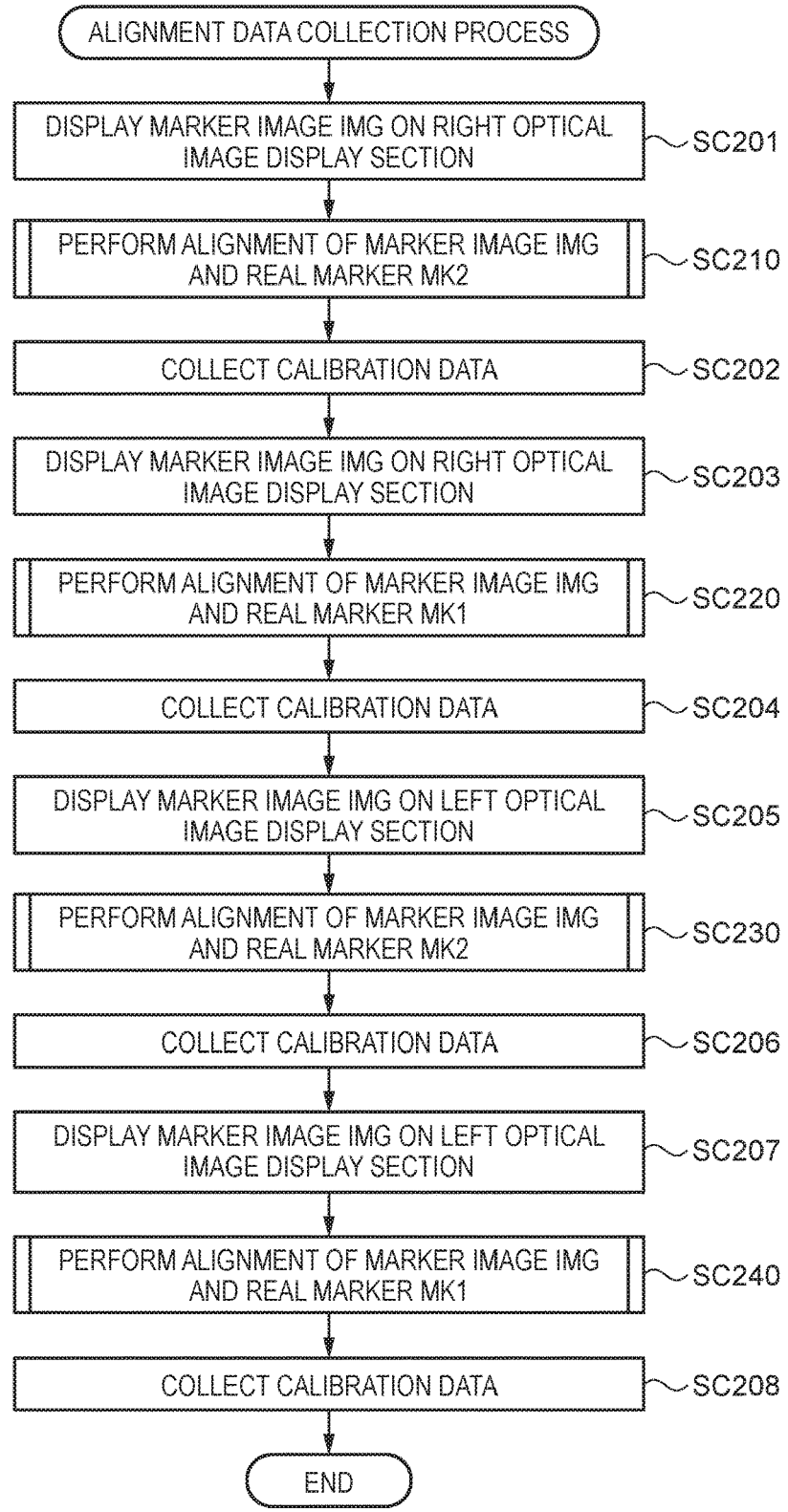
FIG. 16 is a flow chart illustrating an alignment data collection process.

FIG. 16 is a flow chart illustrating an alignment data collection process. In the alignment data collection process, the parameter setting section 167 collects calibration data in a state where alignment regarding the right optical image display section 26 is established, and collects calibration data in a state where alignment regarding the left optical image display section 28 is established.

Figure 17:
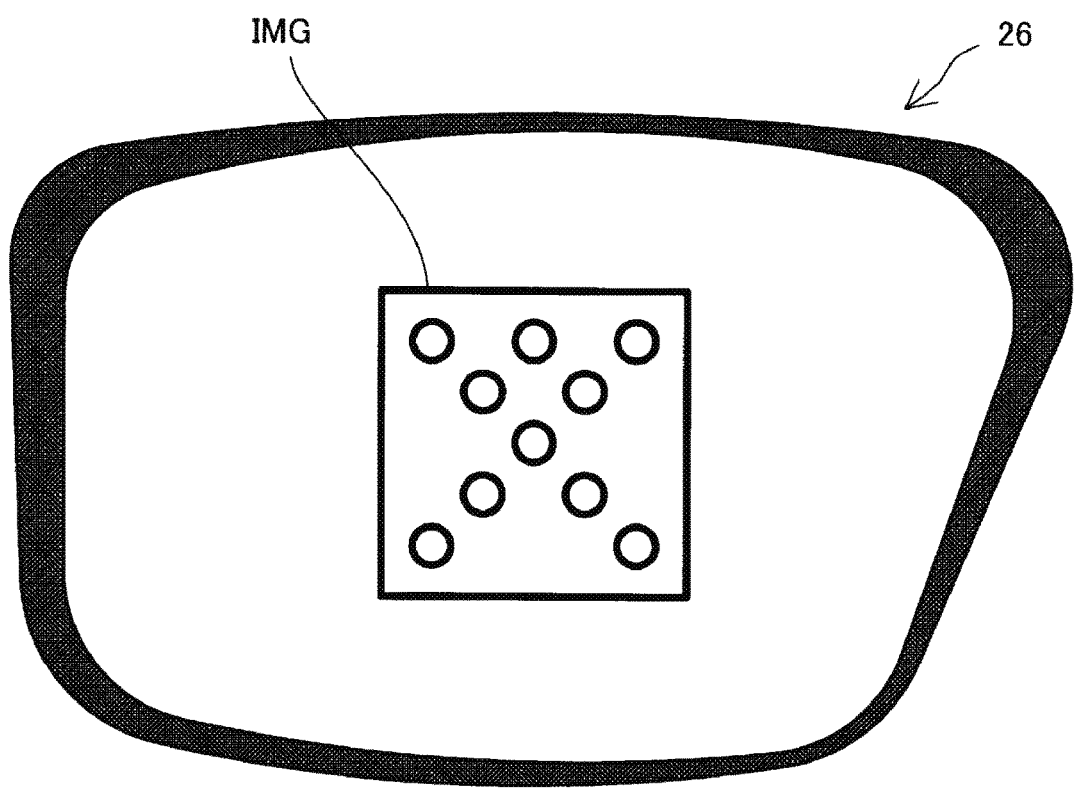
FIG. 17 is a diagram showing an image of a right optical image display section in a case where a marker image is displayed.

In the alignment data collection process, first, the display setting section 165 displays a marker image IMG on the right optical image display section 26 (SC201). FIG. 17 is a diagram illustrating a marker image IMG displayed on the right optical image display section 26. As illustrated in FIG. 17, the display setting section 165 displays an outer frame of a square of a marker and outer frames of ten circles included in the square on the right optical image display section 26. The display setting section 165 displays the marker image IMG on the right optical image display section 26 as a red line. Meanwhile, in FIG. 17, portions other than the right optical image display section 26 within the image display section 20 are not illustrated.

When the marker image IMG is displayed on the right optical image display section 26, the parameter setting section 167 prompts a user to match the positions and poses of the marker image IMG and a real marker MK2 with the HMD 100 worn on the user US so that the marker image and the real marker are visually perceived so as to be aligned with each other (SC210).

A message may further be displayed on the right optical image display section 26. In a case where the marker image INC and the real marker MK2 are visually perceived by the user so as to be aligned with each other, the HMD 100 instructs the user to operate a touch pad, to press a button, or to utter a sound command. In a case where the parameter setting section 167 receives these operations or the sound command, the camera 60 images the real marker MK2, that is, collects calibration data (SC202). In a case where the parameter setting section 167 collects calibration data on the basis of the sound command, it is expected that the head of the user will scarcely move. For this reason, in an operation based on the sound command, it is possible to collect calibration data in a state where there is a little deviation from alignment established by the user, as compared to a case of a touch operation or the pressing of a button. As a result, the HMD 100 having a high level of superposition accuracy of an AR image is obtained.

When the process of matching the positions and poses of the marker image IMG and the real marker MK2 (alignment process by visual observation) of SC210 and the collection of calibration data are performed, the display setting section 165 displays the marker image IMG on the right optical image display section 26 as illustrated in FIG. 17, similar to the process of SC201 (SC203). Thereafter, the parameter setting section 167 prompts the user to match the positions and poses of the marker image IMG and a real marker MK1 with the HMD 100 worn on the user so that the marker image IMG and the real marker MK1 are visually perceived so as to be aligned with each other (SC220). The real marker MK1 is imaged in this state, and thus the parameter setting section 167 collects calibration data (SC204). Here, the real marker MK1 is larger than the real marker MK2. For this reason, in the process of SC220, in a case where the marker image IMG and the real marker MK1 are visually perceived by the user so as to be aligned with each other, a distance between the right optical image display section 26 and the real marker MK1 becomes larger than that in a case of the real marker MK2.

The parameter setting section 167 performs processes of SC205 to SC208 of FIG. 16 with respect to the left optical image display section 28, as the same processes as the processes of SC201 to SC204 in the right optical image display section 26, and terminates the alignment data collection process.

Figure 18:
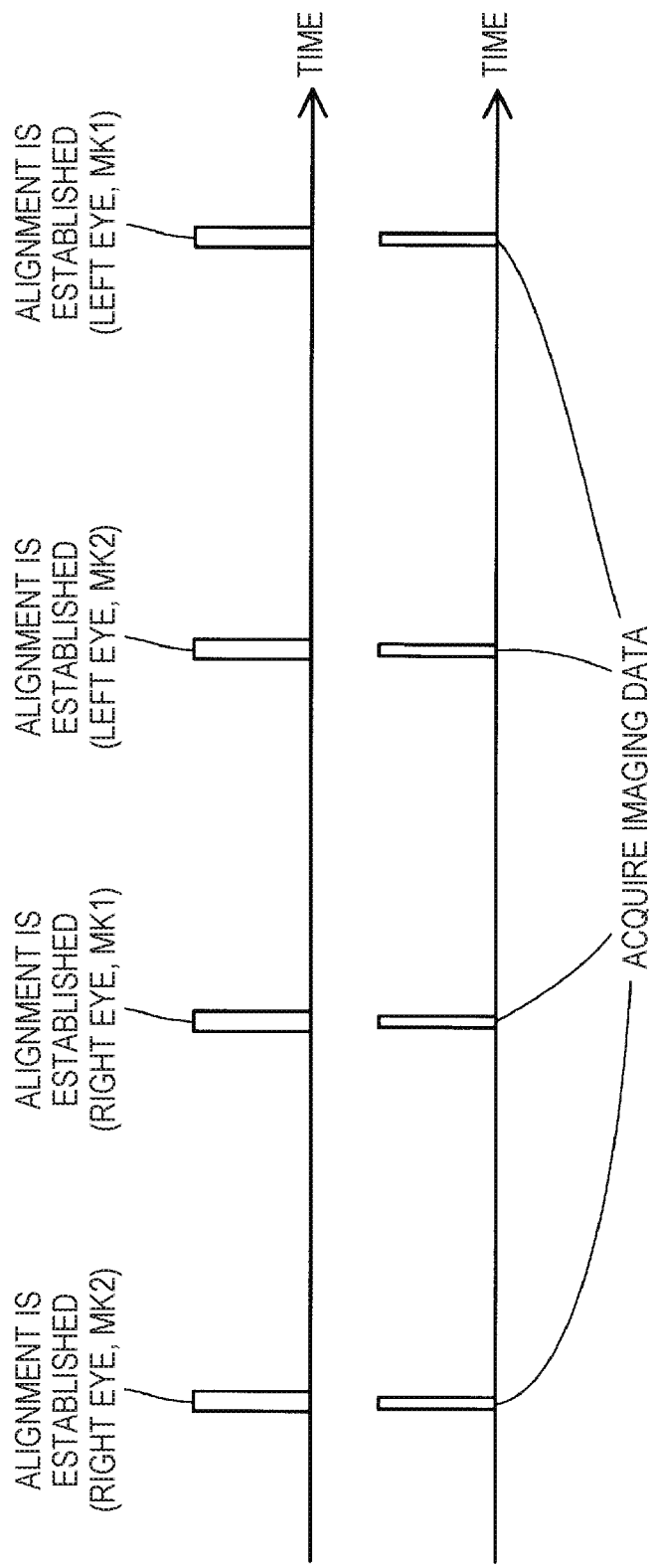
FIG. 18 is a timing chart of an alignment data collection process.

FIG. 18 is a timing chart of the alignment data collection process FIG. 8 illustrates that calibration data (imaging data) is collected in a case where alignment is established, as described in FIG. 16. Each of the real markers MK1 and MK2 used in the alignment data collection process is a second real marker.

Figure 19:
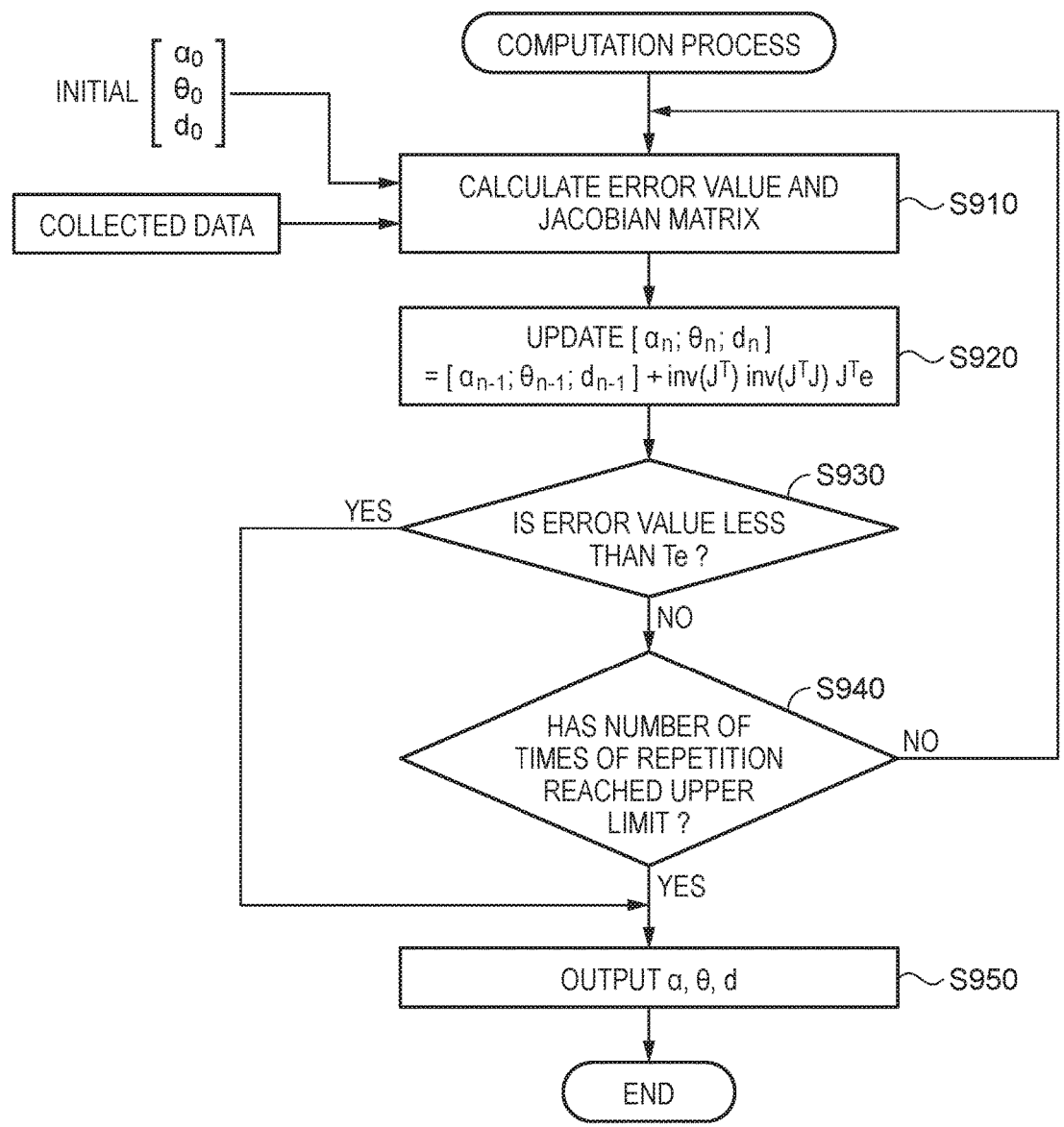
FIG. 19 is a flow chart illustrating a computation process.

Next, as illustrated in FIG. 10, a computation process is performed (S900). FIG. 19 is a flow chart illustrating a computation process. First, an error value and a Jacobian matrix are calculated on the basis of an initial setting value $[\alpha_0 \ \theta_0 \ d_0]^T$ and collected data (S910). The collected data refers to data collected by the rotation data collection process and data collected by the alignment data collection process, Hereinafter, an additional description of S910 will be given.

IMU-camera calibration is realized by the determination of a transformation matrix $T_{cam2imu}$. OSTC calibration is realized by the determination of a transformation matrix $T_{cam2display}$. Here, $T_{cam2display}$ is a parameter including rotation and translation between the camera 60 and the optical image display sections 26 and 28. When the two transformation matrixes are combined with each other using an angle θ, an angle α, and a displacement d, the following expression for realizing joint calibration is obtained.

$$T_{cam2display} = T_{d02d}(d) T_{(imu2d0)}(\alpha) T_{cam2imu}(\theta) \quad (u)$$

The angle θ, the angle α, and the displacement d (or the relationships of the angle θ, the angle α and displacement d with respective matrices) are determined by an offline lookup table or the following functions.

$$T_{imu2d0} = T_{imu2d0}(\alpha) \quad (w)$$

$$T_{d02d} = T_{d02d}(d) \quad (x)$$

When initial estimation values of the angle θ, the angle α, and the displacement d are given, it is possible to find an optimal angle θ, angle α, and displacement d for optimizing a cost function. When an optimal angle θ, angle α, and displacement d are found, the following expression is obtained by substituting Expression (v), Expression (w), and Expression (x) for Expression (u).

$$T_{cam2display} = T_{d02d} T_{imu2d0} T_{cam2imu} \quad (y)$$

The cost function will be described below. First, a set of rotation errors in a period including a case where nodding (rotation of a head) is performed and a case where the rotation of the head is not performed are defined by the following expression.

$$E_{rot} = \Sigma \| \omega_c - R_{imu2cam} \omega_I \|^2 \quad (z)$$

Here, $R_{imu2cam}$ is a rotation matrix from an IMU coordinate system to a camera coordinate system. Both $\omega_c$ and $\omega_I$ in the above-mentioned expression are angular velocity vectors of the HMD 100 from a point in time of the first SC217 to a point in tine of the second SC217 in the rotation data collection process. The angular velocity vector $\omega_c$ is computed from imaging data collected iso SC217. The angular velocity vector $\omega_I$ is computed from IMU orientations collected in SC217. The angular velocity $\omega_I$ indicates the motion of the IMU 71 from a first position to a second position.

On the other hand, an alignment error of right and left eyes is defined by the following expression. An additional description of the following expression will be given later.

$$E_{align} = \Sigma \| p\text{-Proj}(CP, T_{cam2dispaly}) \|^2 \quad (aa)$$

Here, a small letter p included in Expression (aa) denotes positional information. regarding the circles 1 to 9 which is obtained from the imaging data collected in the alignment data collection process, and is expressed by a two-dimensional image coordinate system. fixed to the image sensor. Here, "Proj" means a transformation matrix for Performing projection transformation of the positions of circles 1 to 9 of a model marker, expressed by a three-dimensional coordinate system of which the origin is fixed to a model, from the three-dimensional coordinate system to the above-mentioned image coordinate system. Here, parameters of the projection transformation include a camera parameter CP of the camera 60, and a transformation matrix $T_{cam2display}$ indicating a spatial relationship between the camera 60 and the optical image display sections 26 and 28. The transformation matrix $T_{cam2display}$ is obtained from the angle θ, the angle, and the displacement d by Expression (u) to Expression (γ).

A cost function for joint estimation (in other words, Joint calibration) is defined as in the following expression. Here, λ, denotes a constant for weight. The error value calculated in S910 refers to a value on the left side which computed by the following expression.

$$E = E_{align} + \lambda E_{rot} \quad (bb)$$

The following Jacobian (Jacobian matrix) J is calculated using an error value.

$$J = [\partial E / \partial \alpha \; \partial E / \partial \theta \; \partial E / \partial d] \quad (cc)$$

In the present embodiment, a calibration parameter is updated in order to minimize a cost function (error value) by using iterated calculation based on a Gaussian Newton's method (S920). S920 is performed as in the following expression.

$$[\alpha_n; \theta_n; d_n] = [\alpha_{n-1}; \theta_{n-1}; d_{n-1}] + \text{inv}(J^T \text{inv}(J^T J) J^T e \quad (dd)$$

Restriction conditions in the above-mentioned expression are as follows:

$$\alpha_{min} < \alpha_n < \alpha_{max} \quad (ee)$$

$$\theta_{min} < \theta_n < \theta_{max} \quad (ff)$$

$$d_{min} < d_n < d_{max} \quad (gg)$$

Here, e included in Expression (dd) is the content of a norm of each of Expression (z) and Expression (aa). In other words, a is "$\omega_c - R_{imu2cam} \omega_I$" and "p-Proj (P, $T_{cam2display}$)".

Subsequently, it is determined whether or not the computed error value is less than a reference value Te (S930). In a case where the computed error value is equal to or greater than the reference value Te (S930, NO), it is determined whether or not the number of times of the execution of S910 and S920 has reached an upper limit (S940). In a case where the number of times of the execution of S910 and S920 has not reached the upper limit (S940, NO), S910 and S920 are performed again.

On the other hand, in a case where the computed error value is less than the reference value Te (S930, YES) or in a case where the number of times of the execution of S910 and S920 has reached the upper limit (S940, YES), a transformation parameter Tcam2display is output on the basis of the values of an angle α, an angle θ, and a displacement d in the current state and/or a relationship between Expression (u) to Expression (y) (S950), and the computation process is terminated.

Parameter Improvement Process (S1000)

Next, a description will be given of a process in which the parameter setting section 167 improves spatial relationship (also referred to as a transformation parameter. $T_{cam2display}$) between the camera 60 and the optical image display section which is derived in S900. In the improvement process according to the present embodiment, a camera parameter of the camera 60 is derived, along with the improvement of the above-mentioned spatial relationship. Meanwhile, in an improvement process of another embodiment, a camera parameter does not necessarily have to be optimized, and may be fixed to a design value. However, in the present embodiment to be described below, an algorithm including a camera parameter as an optimization variable(s) is present so that a user can optimize the camera parameter as necessary. In another embodiment, in a case where not necessary to optimize the camera parameter, the following expressions may be dealt with using these parameters as constants (fixed values).

With Regard to Camera Parameter

As a camera parameter regarding the camera 60, four camera parameters (fx, fy, Cx, Cy) are used in the present embodiment. The camera parameters (fx, fy) are focal lengths of the camera 60 which is an imaging section, and are converted into the number of pixels on the basis of the density of pixels. The camera parameters (Cx, Cy) are called the camera principal point position which means the center position of a captured image. For example, (Cx, Cy) may be expressed by, for example, a 2D coordinate system which is fixed to an image sensor of the camera 60.

The camera parameter can be known from the product specifications of the camera 60 constituting a principle portion of the imaging section (hereinafter, also referred to as a default camera parameter). However, in many cases, a camera parameter of a real camera greatly departs from a default camera parameter. In addition, when cameras are different products in spite of having the same specifications, camera parameters of cameras for each product vary (are not even).

In a case where at least one of a position, size, and pose in an AR model displayed on the optical image display sections 26 and 28 as an AR image is visually perceived by a user so as to be aligned with (superposed on) a real object, the camera 60 functions as a detection device that detects the position and pose of the real object. At this time, the parameter setting section 167 estimates the position and pose of the real object imaged by the camera 60 with respect to the camera 60 using the camera parameter. Further, the parameter setting section 167 transforms the position and pose to the position and pose of a real object with respect to the left optical image display section 28 using a relative positional relationship between the camera 60 and the left optical image display section 28 (right optical image display section 26). Further, the parameter setting section 167 determines the position and pose of the AR model on the basis of the transformed position and pose. In addition, the image processing section 160 projects (transforms) the AR model having the position and the pose to a display region using a projection parameter, and writes the projected AR model in a display buffer (for example, the RAM 122). In addition, the display control section 190 displays the AR model written in the display buffer on the left optical image display section 28. For this reason, in a case where the camera parameter is a default camera parameter, the estimated position and pose of the real object may include errors. In this case, a user visually perceives as if there is an error in superposing the displayed AR model on the real object due to the errors of the estimated position and pose.

Consequently, in the present embodiment, the parameter setting section 167 optimizes and sets a camera parameter using pieces of imaging data of the real marker MK2 and the real marker MK1 during calibration for mellowing an AR model to be superposed on an object and to be visually perceived by a user. In addition, the position and pose of the object are detected (estimated) using the set camera parameter. In this manner, the degree to which a deviation generated between the displayed AR model and a real object is visually perceived by a user becomes lower in displaying the AR model. As described later, even when the same user uses the same HMD 100, it is preferable that a camera parameter is set whenever calibration is performed and is used for a subsequent display in which at least one of the position, size, and orientation of an object is aligned with that of an AR model. This does not indicate that a user necessarily matches the positions and poses of a real marker MK2 or a real marker MK1 and a marker image IMG corresponding to the real marker MK2 or the real marker MK1 with the same level of accuracy during calibration. Even when a user matches positions and poses with different levels of accuracy, a camera parameter is set accordingly, thereby suppressing an increase in a deviation of superposition display in a case where an AR model and a real object are displayed so as to be superposed on each other.

With Regard to Transformation Parameter

In addition, the HMD 100 has a structure in which a relative positional relationship between the camera 60 and the optical image display sections 26 and 28 changes. As understood from a description of a default camera parameter, in a case where causing at least one of the position, size, and pose of an AR model to be visually perceived by a user so as to be aligned with (superposed on) a real object, the display of the AR model based on a relative positional relationship different from a real relative positional relationship between the camera 60 and the optical image display sections 26 and 28 makes an error visually perceived in the displayed AR model and a real object that are superposed on each other.

Consequently, in the present embodiment, a transformation parameter indicating a relative positional relationship (at least one of rotation and translation) between a coordinate system of the camera 60, a coordinate system of the right optical image display section 26, and a coordinate system of the left optical image display section 28 is adjusted or set, during calibration for making an AR model visually perceived by a user so as to be superposed on an object. When the AR model is displayed using a spatial relationship (relative positional relationship) indicated by the set transformation parameter, the degree to which a deviation is visually perceived by a user becomes lower.

In the present embodiment, the parameter setting section 167 sets a right transformation parameter [$R_{cam2right}$, $t_{cam2right}$] corresponding to the right optical image display section 26 and a left transformation parameter [$R_{cam2left}$, $t_{cam2left}$] corresponding to the left optical image display section 28. A rotation matrix $R_{cam2right}$ is three parameters that are determined by the rotation of three axes perpendicular to each other, and a translation matrix $t_{cam2right}$ is three parameters that respectively correspond to translations along the three axes. That is, the right transformation parameter PMR corresponding to the right optical image display section 26 includes a total of six parameters. Similarly, the transformation parameter corresponding to the left optical image display section 28 is a rotation matrix $R_{cam2left}$ and a translation matrix $T_{cam2left}$, and includes a total of six parameters. As described above, in the present embodiment, 16 parameters of four parameters included in a camera parameter and 12 transformation parameters indicating a spatial relationship are computed.

Parameter Derivation Process

The parameter setting section 167 computes a camera parameter and a transformation parameter using Expression (ss) to be described later, on the basis of the captured image acquired in the alignment data collection process. In the present embodiment, the transformation parameter Tcam2display obtained in step S900 is used as an initial value (i=0) in a case where a setting parameter is set.

Figure 20:
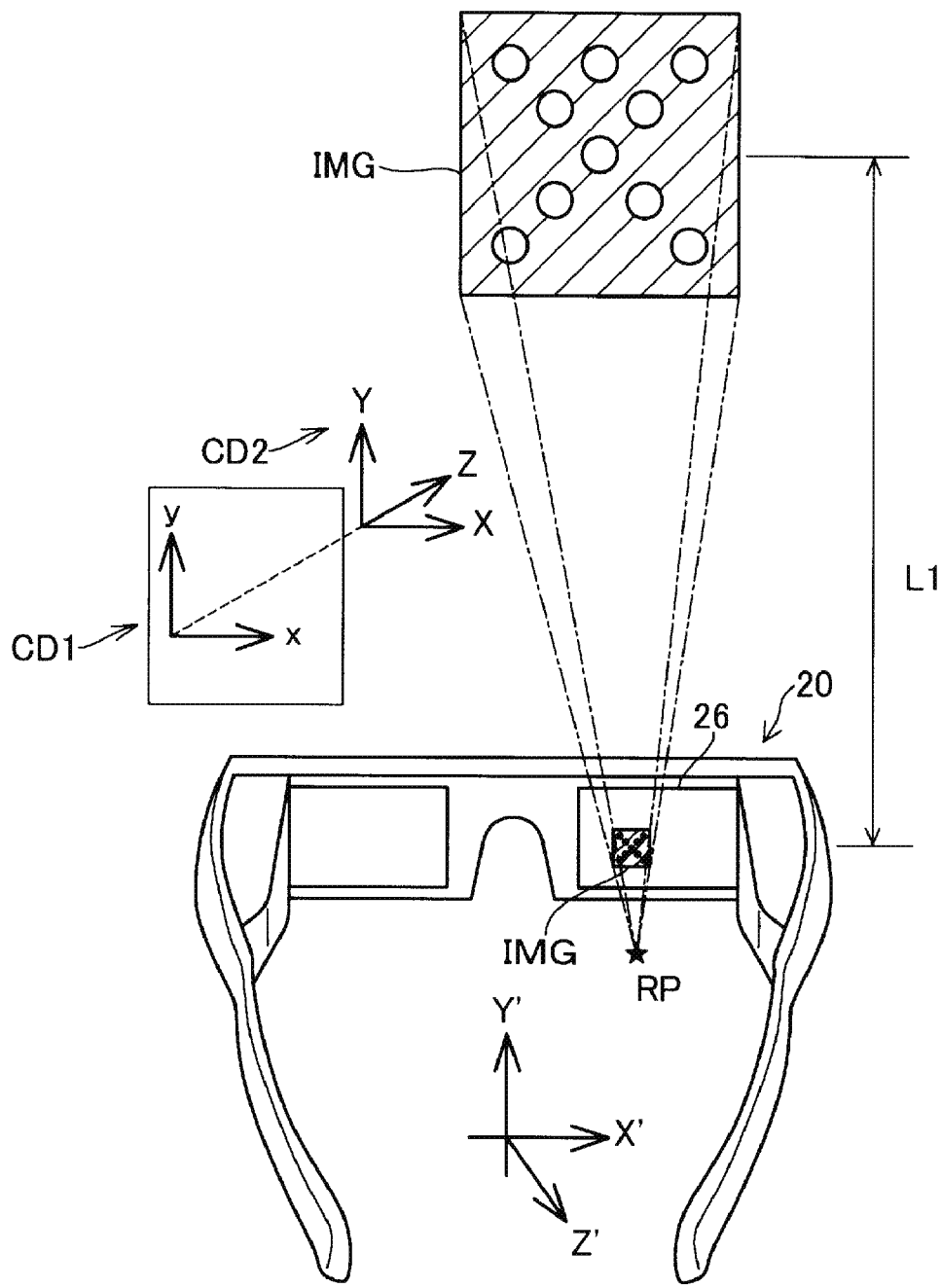
FIG. 20 is a schematic diagram showing a spatial positional relationship in a state where a marker image is displayed.

FIG. 20 is a schematic diagram illustrating a spatial positional relationship in a state where a marker image IMG is displayed on only the right optical image display section 26. FIG. 20 schematically illustrates a case where a user visually perceives a marker image IMG displayed on the right optical image display section 26 from a right eye position RP which is set in advance as the position of a virtual right eye of the user wearing the HMD 100. In other words, FIG. 20 illustrates the state of SC201 or SC203 in the alignment data collection process. Meanwhile, FIG. 20 illustrates only the image display section 20 within the HMD 100, and does not illustrate the mounting band 90, the control section 10, and the like. FIG. 20 illustrates a coordinate axis CD2 indicating a coordinate axis of an outside scene which is three-dimensional space to be imaged, and a coordinate axis CD1 indicating a coordinate axis of a two dimensional image in which the coordinate axis CD2 is projected. The user visually perceives the marker image IMG displayed on the right optical image display section 26 as a real marker MK1 which is present at a position separated from the image display section 20 at a distance L1.

As illustrated in FIG. 20, in a case where a user visually perceives the marker image IMG displayed on the right optical image display section 26 and a real marker MK1 which included in an outside scene and is positioned at the front so that the positions, sizes, and orientations of the marker image and the real marker are aligned with each other (hereinafter, also referred to as a case where a user establishes alignment by his or her right eye RE (left eye LE)), the following relationship of Expression is established between coordinate systems. Meanwhile, hereinafter, a description will be given of a case where a marker image IMG is displayed on the left optical image display section 28 instead of being displayed on the right optical image display section 26.

$$CP \times [R_{o2dl}, t_{o2dl}] \times \text{ModelMatrix} = CP \times [R_{cam2left}, t_{cam2left}] \times [R_{obj2cam}, t_{obj2cam}] \times \text{ModelMatrix} \quad \text{(hh)}$$

Here, CP on each of the right and left sides indicates a camera parameter of the camera 60. In addition, $[R_{o2dl}, t_{o2dl}]$ indicates a transformation matrix from a coordinate system fixed to a real object (in this case, a real marker MK2 or a real marker MK1) to a coordinate system fixed to the left optical image display section 28. Among these, $R_{o2dl}$ indicates a 3×3 matrix indicating rotations. In addition, $t_{o2dl}$ indicates a 3×1 matrix indicating translation. Here, $[R_{o2dl}, t_{o2dl}]$ indicates the position and pose of the real object with respect to the left optical image display section 28. In addition, ModelMatrix indicates a 3×1 matrix indicating any one point on a model marker. The model marker is three-dimensional data (three-dimensional model: but is a plan in the present embodiment) which is a basis in a case where a marker image IMG is displayed on the left optical image display section 28. The notation of $[R_{o2dl}, t_{o2dl}] \times \text{ModelMatrix}$ goes by a rule of the following Expression.

$$[R_{o2dl}, t_{o2dr}] \times \text{ModelMatrix} = [R_{o2dl}] \times \text{ModelMatrix} + [t_{o2dl}] \quad \text{(ii)}$$

The rule of the notation of the above-mentioned expression is also applied to other portions of Expression (hh).

Here, $[R_{cam2left}, t_{cam2left}]$ on the right side of Expression (hh) indicates a transformation matrix from the coordinate system of the camera 60 to the coordinate system of the left optical image display section 28. The transformation matrix is constituted by a plurality of transformation parameters that are set by the parameter setting section 167. In addition, $[R_{obj2cam}, t_{obj2cam}]$ on the right side of Expression (hh) indicates a transformation matrix from a coordinate system of a real object (a real marker MK2 or a real marker MK1) to the coordinate system of the camera 60. In addition, $[R_{obj2cam}, t_{obj2cam}]$ indicates the position and pose of the real object with respect to the camera 60.

From the relationship of Expression (hh) when alignment between a marker image IMG and the real marker MK2 or the real marker MK1 is established with respect to the left optical image display section 28, the following two expressions are established.

$$R_{obj2cam} = \text{inv}(R_{cam2left}) * R_{o2dl} \quad \text{(jj)}$$

$$t_{obj2cam} = \text{inv}(R_{cam2left}) * (t_{od2l} - t_{cam2left}) \quad \text{(kk)}$$

In a case where the pose of the real marker MK2 or the real marker MK1 with respect to the camera 60 is applied to a model marker when it is assumed that the alignment of the left eye LE is established, any point on the model marker transformed into the coordinate system of the camera 60 is expressed as $P_{cl} (X_{cl}, Y_{cl}, Z_{cl})$ of the following expression.

$$P_{cl} = [X_{cl}\ Y_{cl}\ Z_{cl}]^T = R_{obj2cam} \times \text{ModelMatrix} + t_{obj2cam} \quad \text{(ll)}$$

Here, when $R_{obj2cam}$ and $t_{obj2cam}$ are erased by Expression (jj) and Expression (kk), Expression (ll) changes to the following expression.

$$P_{cl} = [X_{cl}\ Y_{cl}\ Z_{cl}]^T = \text{inv}(R_{cam2left})(R_{o2dl} \times \text{ModelMatrix} + t_{o2dl} - t_{cam2left}) \quad \text{(mm)}$$

Here, $R_{o2dl}$ and $t_{o2dl}$ respectively indicate rotation and translation from the coordinate system of the real marker MK2 or the real marker MK1 to the coordinate system of the left optical image display section 28. In the present embodiment, the marker image IMG is fixed and displayed at a predetermined position (for example, the center) on the left optical image display section 28 with a predetermined orientation and a predetermined size, when the user aligns the marker image IMG displayed on the left optical image display section 28 with the real marker MK2 or the real marker MK1 so that $R_{o2dl}$ and $t_{o2dl}$ become predetermined rotation and translation. Here, $t_{cam2left}$ indicates translation from the coordinate system of the camera to the coordinate system of the left optical image display section 28. Meanwhile, $R_{o2dl}$ is a unit matrix as described below. Mother words, even when transformation is performed from the coordinate system of the real marker MK2 or the real marker MK1 to the coordinate system of the left optical image display section 28, rotation does not occur.

$$R_{o2dl} = \begin{bmatrix} 1 & 0 & 0 \\ 0 & 1 & 0 \\ 0 & 0 & 1 \end{bmatrix} \quad (2)$$

$$t_{o2dl} = [0\ \ 0\ \ -a]^T \quad \text{(nn)}$$

$$t_{cam2left} = [D1\ \ D2\ \ D3]^T \quad \text{(oo)}$$

Elements in Expression (2) and Expression (nn) are constants in the present embodiment. An absolute value of −a in Expression (nn) is the distance L1 described in FIG. 20. Elements D1, D2, and D3 in Expression (oo) are translation components included in the transformation parameter Tcam2display which is obtained in step S900 in the present embodiment, and may vary during a parameter derivation process. Meanwhile, as seen from FIG. 20, in the present embodiment, in a coordinate system fixed to the image display section 20, a direction of light emitted from the optical image display sections 26 and 28 (image display section 20) to a user's eyes is parallel to the Z-axis direction.

When a model marker expressed by Expression (ll) is mapped onto a captured image obtained by the camera 60, the coordinates of the model marker on the captured image are as follows.

$$x_{iml} = F_x(X_{cl}/Z_{cl}) + C_x \tag{pp}$$

$$y_{iml} = F_y(Y_{cl}/Z_{cl}) + C_y \tag{qq}$$

Here, $(F_x, F_y)$ denotes a focal length of the camera 60, and $(C_x, C_y)$ denotes coordinates of a principal point position of the camera 60.

When the coordinates of a feature element of the real marker MK2 or the real marker MK1 in a captured image in a case where the camera 60 actually images the marker are expressed by $(u_l, v_l)$, a difference between $(u_l, v_l)$ and $(x_{iml}, y_{iml})$ is as follows.

$$e_j = [e_x \ e_y]^T = [u_{lj} - x_{imlj} \ v_{lj} - y_{imlj}]^T, j=1 \text{ to } 9 \tag{rr}$$

The subscript j in the above-mentioned expression takes an integer of 1 to 9 as a value indicating the feature element in the marker. The parameter setting section 167 derives a square sum expressed by the following expression with respect to the alignment of a left eye LE.

$$E_L = \Sigma_{j=1}^{9} \{(u_{lj} - x_{imlj})^2 + (v_{lj} - y_{imlj})^2\} \tag{3}$$

Similarly, a square sum expressed by the following expression is derived with respect to a case where a user establishes alignment of a marker displayed on the right optical image display section 26 and the real marker MK2 or the real marker MK1 in the right eye RE.

$$E_R = \Sigma_{j=1}^{9} \{(u_{rj} - x_{imrj})^2 + (v_{lj} - y_{imrj})^2\} \tag{4}$$

$E_{align}$ is defined as the sum of $E_L$ and $E_R$.

$$E_{align} = E_L + E_R \tag{ss}$$

Expression (ss) and Expression (aa) differ from each other in form, but are substantially the same as each other. An improvement process (S1000) is performed on the basis of the above-described contents.

According to the present embodiment, it is possible to obtain at least the following effects. Since a spatial relationship between the camera 60 and the IMU 71 can be derived, the inertia and optical uniting tracking of a real object progress favorably. In other words, even when the relative position of the real object changes, a user can continuously visually perceive a state where the real object and the corresponding image are aligned with each other with a high level of accuracy.

Furthermore, an IMU is not necessary on the real marker MK1 (control section 10) side. In addition, since OSTC (calibration necessary for overlapping display of AR) and IMU-camera calibration are simultaneously performed, a high success rate of calibration is obtained for a general user. For this reason, the invention is suitable for AR used as operation support and the guidance of an art museum, and the like.

The invention is not limited to the embodiments, the examples, or the modifications of this specification and can be implemented in various configurations without departing from the spirit of the invention. For example, technical features of the embodiments, the examples, and the modifications corresponding to technical features in the forms described in the summary of the invention can be replaced or combined as appropriate in order to solve a part or all of the problems explained above or attain a part or all of the effects explained above. Unless the technical features are not explained in this specification as essential technical features, the technical features can be deleted as appropriate. For example, technical features described below are examples of such technical features.

Exhaustive search is used instead of nonlinear optimization accompanied by repeated calculation, and thus θ, α, and d may be obtained by usage for increasing accuracy. Specifically, θ, α, and d may be obtained as follows. The following expression is derived using spherical linear interpolation (SLERP) and quaternions (p, q, γ, t).

$$\text{SLERP}(p, q, t) = [p \sin\{(1-t)\gamma\} + q \sin \gamma]/\sin \gamma \tag{tt}$$

Calibration may be performed using any cost function of a rough cost function for searching for a parameter t included in the above-mentioned expression in units of 0.25 (t=0, 0.25, 0.5, 0.75, 1) from 0 to 1 and a highly-accurate cost function for searching for the parameter in units of 0.1 (t=0, 0.1, 0.2, . . . ,1) from 0 to 1.

In the rough cost function, a parameter t* equivalent to a parameter t after optimization is expressed by the following expression.

$$R_{cam2imu} = \text{quantion2Rot}(\text{SLERP}(p, q, t^*)) \tag{uu}$$

Figure 21:
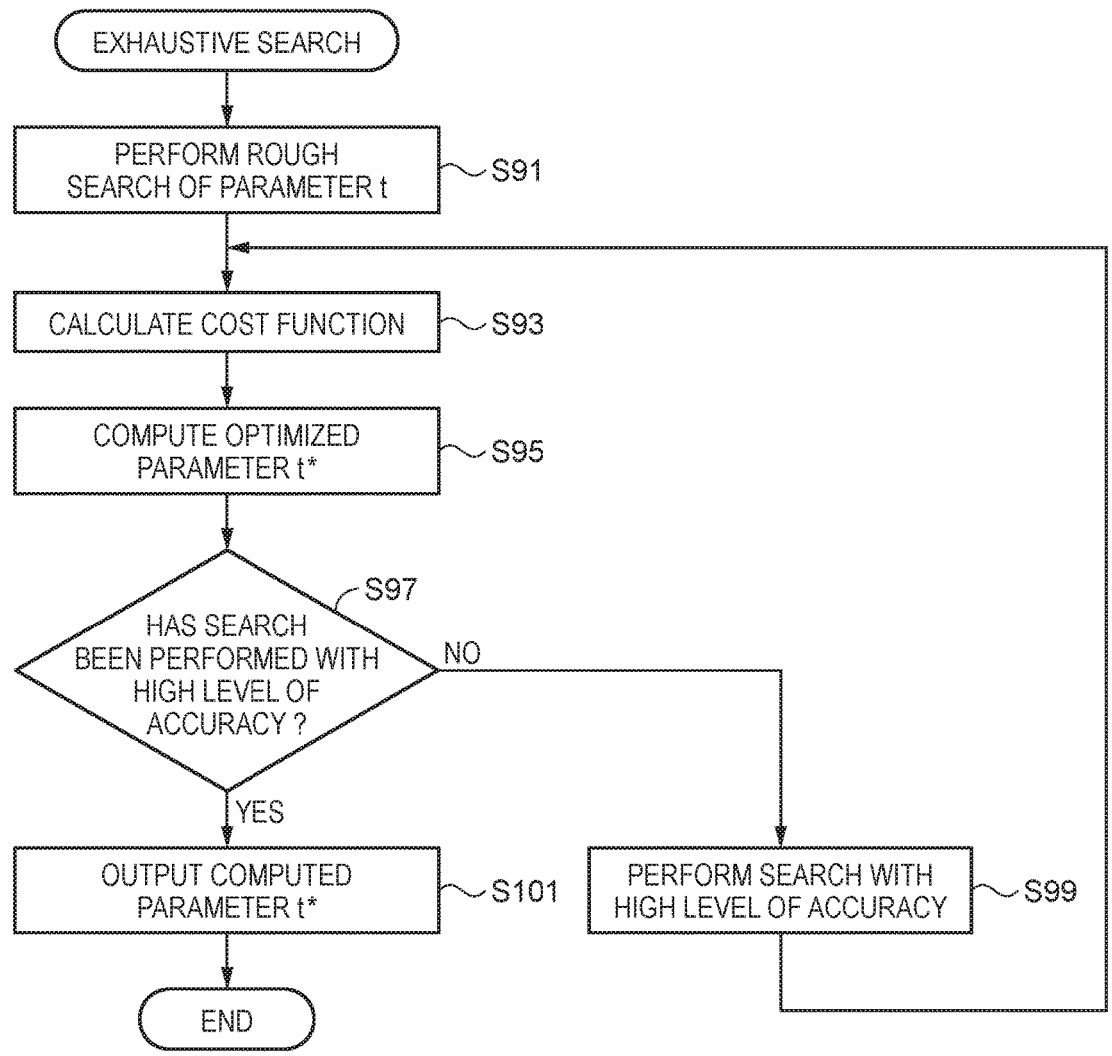
FIG. 21 is a flow chart illustrating exhaustive search.

FIG. 21 is a flow chart illustrating exhaustive search. First, a parameter t is searched for in units of 0.25 from 0 to 1 (S91). Next, the parameter setting section 167 calculates a cost function (Expression (bb)) using search results (S93). Subsequently, a parameter t* corresponding to global minimum is computed by calculating the cost function (S95).

Next, it is determined whether to further optimize the computed t* through highly-accurate search, in accordance with an instruction which is set in advance (S97). In a case where it is determined that highly-accurate search is performed (S97, YES), highly-accurate search is performed on a value approximate to the computed t* (S99), and the process of S93 and the subsequent processes are performed. In a case where it is determined that highly-accurate search is not performed (S97, NO), the computed parameter t* is output (S101).

In the above-described embodiment, some or all of the functions and processes which are realized by software may be realized by hardware. In addition, some or all of the functions and processes which are realized by hardware may be realized by software. As the hardware, various circuits such as an integrated circuit, a discrete circuit, and a circuit module which is a combination of the circuits may be used.

Since OSTC calibration and IMU-camera calibration are collectively performed, alignment may be performed once on each of the right and left eyes in an alignment data collection process for OSTC calibration. In this manner, it is possible to reduce the number of times of alignment to be performed by a user.

An alignment data collection process may be performed prior to a rotation data collection process.

Imaging performed as calibration collection (SC217) in the rotation data collection process may be realized by capturing a moving image. For example, a moving image may be continuously captured by a camera at all times during the rotation data collection process.

The derivation of an angular velocity $\omega_I$ may be performed using a function of detecting an angular velocity of the IMU 71. For example, a value obtained by averaging angular velocities from the start of a nodding operation to the termination thereof may be derived as the angular velocity $\omega_I$.

An improvement process (S1000) may be omitted from a calibration process.

The entire disclosure of Japanese Patent Application No. 2016-137529 filed on Jul. 12, 2016, is expressly incorporated by reference herein.

What is claimed is:

1. A non-transitory computer readable medium that embodies instructions that, when executed by a processor, perform a method of calibration for a head-mounted display device including a camera, an inertial sensor, an optical see-through type display, the method comprising:
    acquiring a first image and a second image that are captured by imaging a first real marker with a camera when the camera is respectively at a first position and a second position with respect to the first real marker;
    deriving a motion of an inertial sensor based on output of the inertial sensor when the camera moves from the first position to the second position;
    displaying a marker image corresponding to a second real marker on a display;
    acquiring a third image that is obtained by capturing the second real marker with the camera when a user is allowed to visually perceive the marker image and the second real marker being aligned with each other; and
    deriving a first spatial relationship between the camera and the inertial sensor and a second spatial relationship between the camera and the display based at least on the first image, the second image, the motion of the inertial sensor, and the third image.

2. The non-transitory computer readable medium according to claim 1,
    wherein at least one of the camera and the inertial sensor is movable with respect to one another.

3. The non-transitory computer readable me .L according to claim
    wherein at least one of the camera and the display movable with respect to one another.

4. A head-mounted display device comprising:
    a camera;
    an inertial sensor;
    an optical see-through type display; and
    a processor configured to:
        acquire a first image and a second image that are captured by imaging a first real marker with the camera when the camera is respectively at a first position and a second position relative to the first real marker,
        derive a motion of the inertial sensor based on output of the inertial sensor when the camera moves from the first position to the second position,
        display a marker image corresponding to a second real marker on the display,
        acquire a third image that is obtained by capturing the second real marker with the camera when a user is allowed to visually perceive the marker image and the second real marker being aligned with each other, and
        derive a first spatial relationship between the camera and the inertial sensor and a second spatial relationship between the camera and the display based on at least on the first image, the second image, the motion of the inertial sensor, and the third image.

5. A method of calibration for a head-mounted display device including a camera, an inertial sensor, and an optical see-through type display,
    the method comprising:
    acquiring a first image and a second image that are captured by imaging a first real marker with the camera when the camera is respectively at a first position and a second position relative to the first real marker;
    deriving a motion of the inertial sensor based on output of the inertial sensor when the camera moves from the first position to the second position;
    displaying a marker image corresponding to a second real marker on the display;
    acquiring a third image that is obtained by capturing the second real marker with the camera when a user is allowed to visually perceive the marker image and the second real marker being aligned with each other; and
    deriving a first spatial relationship between the camera and the inertial sensor and a second spatial relationship between the camera and the display based on at least on the first image, the second image, the motion of the inertial sensor, and the third image.

6. The non-transitory computer readable medium according to claim 1, wherein the first real marker and the second real marker are a two-dimensional object or a three-dimensional object.

7. The non-transitory computer readable medium according to claim 4, wherein the first real marker and the second real marker are a two-dimensional object or a three-dimensional object.

8. The non-transitory computer readable medium according to claim 5, wherein the first real marker and the second real marker are a two-dimensional object or a three-dimensional object.

* * * * *